(12) United States Patent
Sanogo et al.

(10) Patent No.: US 11,471,963 B2
(45) Date of Patent: Oct. 18, 2022

(54) RECIPROCATING SAW BLADE

(71) Applicant: BLACK & DECKER INC., New Britain, CT (US)

(72) Inventors: Poinon Sanogo, Enfield, CT (US); Asif Elliston, East Longmeadow, MA (US); Douglas K. Fosberg, Jr., Wilbraham, MA (US); Matthew Christopher Green, Amherst, MA (US); Stephen A. Hampton, East Longmeadow, MA (US); Ashkan Sharifi, Wilbraham, MA (US); Andrew C. Reist, Springfield, MA (US); Mehdi Sebaradar, East Longmeadow, MA (US); Joseph T. Novak, East Longmeadow, MA (US); Kenneth Hall, East Longmeadow, MA (US)

(73) Assignee: Black & Decker Inc., New Britain, CT (US)

( * ) Notice: Subject to any disclaimer, the term of this patent is extended or adjusted under 35 U.S.C. 154(b) by 108 days.

(21) Appl. No.: 16/740,806

(22) Filed: Jan. 13, 2020

(65) Prior Publication Data
US 2020/0238408 A1    Jul. 30, 2020

Related U.S. Application Data

(60) Provisional application No. 62/796,833, filed on Jan. 25, 2019.

(51) Int. Cl.
*B23D 61/12*    (2006.01)

(52) U.S. Cl.
CPC ......... *B23D 61/121* (2013.01); *B23D 61/123* (2013.01)

(58) Field of Classification Search
CPC ........................... B23D 61/121; B23D 61/123
(Continued)

(56) References Cited

U.S. PATENT DOCUMENTS

| 72,983 A | 1/1868 | Davis |
| 239,710 A | 4/1881 | Boynton |

(Continued)

FOREIGN PATENT DOCUMENTS

| CN | 100469234 C | 3/2009 |
| CN | 100544868 C | 9/2009 |

(Continued)

OTHER PUBLICATIONS

Extended European Search Report dated Jun. 9, 2020, pertaining to EP Application No. 20151622.6-1017.

(Continued)

*Primary Examiner* — Stephen Choi
(74) *Attorney, Agent, or Firm* — Scott B. Markow

(57) ABSTRACT

A reciprocating saw blade includes an elongated blade body extending along a blade axis and having a rear end, a front end, a cutting edge having a plurality of teeth, a non-cutting edge opposite the cutting edge; and a tang coupled to the rear end and configured to be received in a blade holder of a powered reciprocating saw. The cutting edge includes inclined and declined cutting edge portions. The inclined cutting edge portion extends away from the blade axis and toward the front end at an acute first angle and extends from a first tooth to a second tooth. The first tooth is closer to the rear end and closer to the blade axis than the second tooth. The declined cutting edge portion extends toward the blade axis and toward the front end at an acute second angle that is greater than the first angle and extends from a third tooth to the first tooth. The first tooth is closer to the front end and closer to the blade axis than the third tooth.

20 Claims, 11 Drawing Sheets

(58) Field of Classification Search
USPC .......................................................... D8/20
See application file for complete search history.

(56) References Cited

U.S. PATENT DOCUMENTS

| | | | |
|---|---|---|---|
| 336,739 A | 2/1886 | Parker | |
| 735,586 A | 8/1903 | Rabie | |
| 817,361 A | 4/1906 | Brown et al. | |
| 1,771,722 A | 7/1930 | Prentice | |
| 1,850,478 A | 3/1932 | Schaefer | |
| 2,239,317 A | 4/1941 | Gibb | |
| 2,568,870 A * | 9/1951 | Ronan | B23D 61/121 83/846 |
| 2,735,317 A | 2/1956 | Sprink | |
| 2,735,458 A | 2/1956 | Buchmann | |
| 4,023,448 A | 5/1977 | Bertini | |
| 4,141,260 A | 2/1979 | Bertini | |
| 4,195,543 A | 4/1980 | Tapply et al. | |
| 5,016,356 A | 5/1991 | Trench | |
| 5,094,135 A | 3/1992 | Nakahara et al. | |
| 5,606,900 A | 3/1997 | Stoddard | |
| 5,848,473 A | 12/1998 | Brandenburg, Jr. | |
| 6,401,585 B1 | 6/2002 | Morgan | |
| 6,532,852 B1 | 3/2003 | Tsujimoto et al. | |
| D479,107 S | 9/2003 | Rack | |
| D479,447 S | 9/2003 | Rack | |
| D484,759 S | 1/2004 | Rack | |
| D485,479 S | 1/2004 | Rack | |
| 8,210,081 B2 | 7/2012 | Elliston et al. | |
| 8,568,204 B2 | 10/2013 | Steiger et al. | |
| 9,522,432 B2 | 12/2016 | Staub | |
| 9,707,634 B2 | 7/2017 | Grolimund et al. | |
| 9,757,807 B2 | 9/2017 | Hampton et al. | |
| 10,857,605 B2 | 12/2020 | Hampton et al. | |
| 11,253,936 B2 | 2/2022 | Kocher et al. | |
| 2001/0041524 A1 | 11/2001 | Steiger et al. | |
| 2003/0010179 A1 | 1/2003 | McLuen | |
| 2010/0016328 A1 | 1/2010 | Kakkis et al. | |
| 2010/0126328 A1 | 5/2010 | Grolimund | |
| 2010/0247232 A1 | 9/2010 | Lin | |
| 2013/0032014 A1 * | 2/2013 | Elliston | B23D 61/121 83/13 |
| 2013/0174701 A1 | 7/2013 | Elliston et al. | |
| 2020/0016672 A1 * | 1/2020 | Kocher | B23D 61/121 |
| 2020/0238408 A1 | 7/2020 | Sanogo et al. | |
| 2022/0001471 A1 | 1/2022 | Imboden et al. | |

FOREIGN PATENT DOCUMENTS

| | | |
|---|---|---|
| CN | 102089108 B | 9/2013 |
| CN | 111390278 A | 7/2020 |
| CN | 110325309 B | 1/2022 |
| DE | 2875 C | 2/1878 |
| DE | 3611063 A1 | 10/1986 |
| DE | 4138025 A1 | 5/1993 |
| DE | 20109811 U1 | 9/2001 |
| EP | 3313545 A1 | 4/1989 |
| EP | 0958088 A1 | 11/1999 |
| EP | 1053815 A2 | 11/2000 |
| EP | 1436113 A1 | 7/2004 |
| EP | 1586401 A1 | 10/2005 |
| EP | 1716956 A1 | 11/2006 |
| EP | 2762255 A1 | 8/2014 |
| EP | 2762266 | 8/2014 |
| EP | 2566648 B1 | 6/2015 |
| EP | 2520389 B1 | 6/2016 |
| EP | 3092099 A1 | 11/2016 |
| EP | 2564966 B1 | 4/2017 |
| EP | 2167293 B1 | 9/2017 |
| EP | 2714345 B1 | 9/2018 |
| EP | 3370910 A1 | 9/2018 |
| EP | 3031562 B1 | 10/2018 |
| EP | 2566671 B1 | 7/2019 |
| EP | 3162484 B1 | 2/2020 |
| EP | 3685946 A1 | 7/2020 |
| EP | 3950246 A1 | 2/2022 |
| FR | 2247322 A1 | 5/1975 |
| SE | 1200590 A1 | 4/2014 |
| WO | 2009024379 A1 | 2/2009 |
| WO | 2019050982 A1 | 3/2019 |

OTHER PUBLICATIONS

European Patent Office Communication pursuant to Article 94(3) EPC, dated May 24, 2022.

* cited by examiner

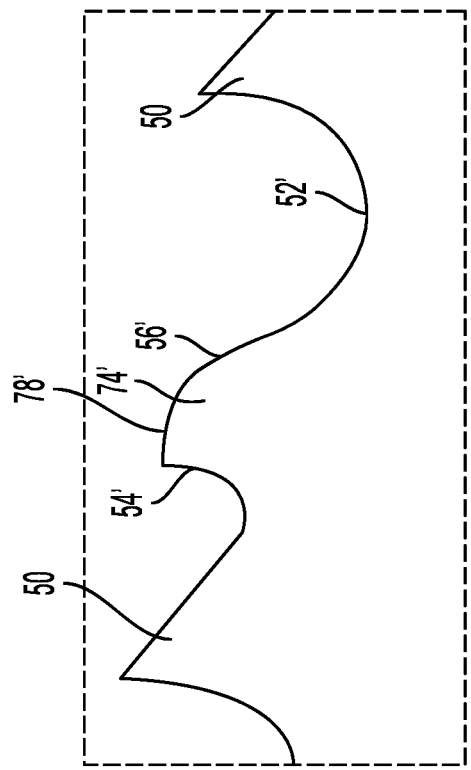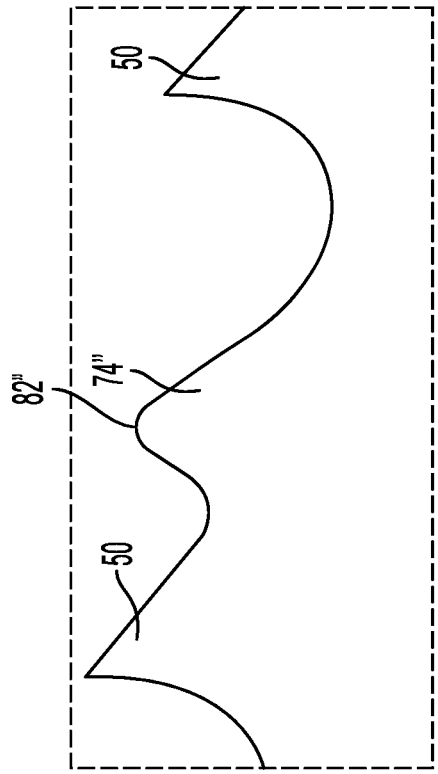

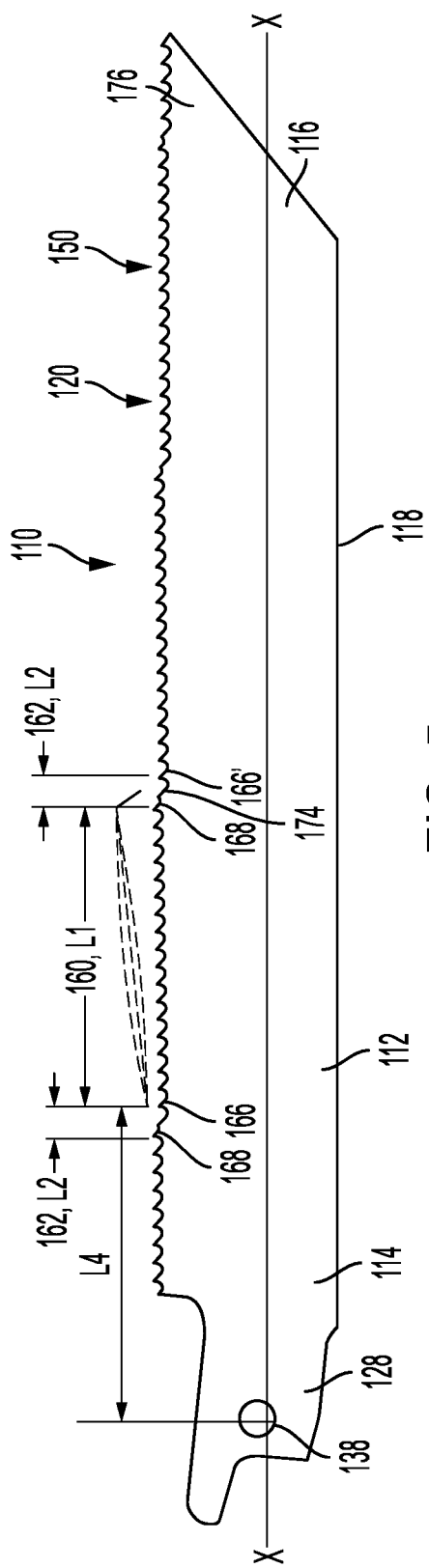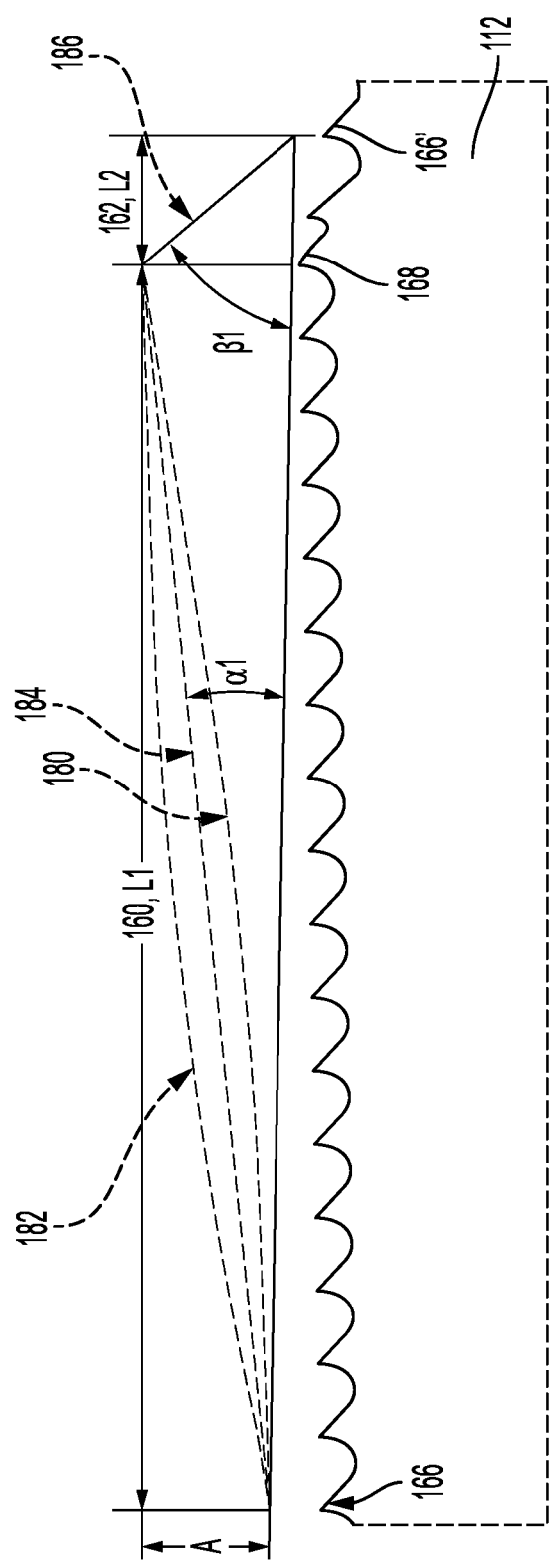
FIG. 5
FIG. 6

RECIPROCATING SAW BLADE

RELATED APPLICATION

This application claims priority under 35 U.S.C. § 119(e) to U.S. Provisional Application No. 62/796,833, filed Jan. 25, 2019, titled "Reciprocating Saw Blade," which is incorporated by reference.

TECHNICAL FIELD

This application relates to reciprocating saw blades for use with powered reciprocating saws.

BACKGROUND

Reciprocating saw blades generally have a blade body extending along a blade axis and having a rear end coupled to a tang for coupling the saw blade to a reciprocating power tool, a front end, a cutting edge extending between the rear end and the front end, and a non-cutting edge opposite the cutting edge and also extending between the rear end and the front end. The cutting edge generally includes a plurality of cutting teeth. In some examples, the teeth all may be substantially the same. In other examples, the teeth may be set in a pattern that may include unset teeth, teeth set left, and teeth set right. In yet other examples, the teeth may have multiple pitches and may have different heights.

The tang may be disposed at a tang angle relative to the blade axis. Increasing the tang angle is generally associated with improvements in life. However, a large tang angle (e.g., over) 6° can be associated with reduced cutting speed, poorer cut quality, and increased vibration. In addition, a large tang angle makes it difficult to cut with the front end portion of the cutting edge or when the shoe of the reciprocating saw does not abut against the workpiece (known as "tip cutting" or "unsupported cutting"). Furthermore, a large tang angle can cause the cutting teeth to rub against the shoe of the powered reciprocating saw during operation.

SUMMARY

In an aspect, a reciprocating saw blade includes an elongated blade body extending along a blade axis and having a rear end, a front end, a cutting edge having a plurality of teeth and extending between the rear end and the front end, and a non-cutting edge opposite the cutting edge and extending between the rear end and the front end. A tang is coupled to the rear end and configured to be received in a blade holder of a powered reciprocating saw. The cutting edge includes (a) an inclined cutting edge portion extending away from the blade axis and toward the front end at an acute first angle to the blade axis, the inclined cutting edge portion extending from a first tooth to a second tooth, the first tooth closer to the rear end and closer to the blade axis than the second tooth; and (b) a declined cutting edge portion extending toward the blade axis and toward the front end at an acute second angle that is greater than the first angle, the declined cutting edge extending from a third tooth to the first tooth, the first tooth closer to the front end and closer to the blade axis than the third tooth; and (c) a parallel cutting edge portion extending toward the front end from the second tooth substantially parallel to the blade axis.

Implementations of this aspect may include one or more of the following features. The cutting edge may include a plurality of the inclined cutting edge portions, a plurality of the declined cutting edge portions, and a plurality of the parallel cutting edge portion. The cutting edge may have a repeating sequence of a declined cutting edge portion, followed by an inclined cutting edge portion, followed by a parallel cutting edge portion. The inclined cutting edge portion may have a first length and the declined cutting edge portion may have a second length that is less than the first length. The parallel cutting edge portion may have a third length that is less than the first length and greater than the second length. The first tooth may be located at approximately a location of a shoe of a reciprocating saw to which the saw blade is configured to be coupled when the saw blade is at a furthest extension of its saw stroke. The tang may include a hole and the first tooth may be located approximately 0.75 inches to approximately 1.50 inches from a center of the hole. The first tooth may be disposed a first distance from the blade axis, the second tooth may be disposed a second distance from the blade axis that is greater than the first distance, and a difference between the second distance and the first distance may define an amplitude by which the inclined cutting edge portion rises relative to the blade axis and the declined cutting edge portion falls relative to the blade axis. The declined cutting edge portion may include at least one intermediate tooth between the third tooth and the first tooth. The at least one intermediate tooth may include at least one bump tooth having a tooth height less than a tooth height of the third tooth. The at least one intermediate tooth may include at least one full size tooth having a configuration that is substantially similar to the third tooth.

In another aspect, a reciprocating saw blade includes an elongated blade body extending along a blade axis and having a rear end, a front end, a cutting edge having a plurality of teeth and extending between the rear end and the front end, and a non-cutting edge opposite the cutting edge and extending between the rear end and the front end. A tang is coupled to the rear end and configured to be received in a blade holder of a powered reciprocating saw. The cutting edge includes (a) an inclined cutting edge portion extending away from the blade axis and toward the front end at an acute first angle to the blade axis, the inclined cutting edge portion extending from a first tooth to a second tooth, the first tooth closer to the rear end and closer to the blade axis than the second tooth; and (b) a declined cutting edge portion extending toward the blade axis and toward the front end at an acute second angle that is greater than the first angle, the declined cutting edge extending from a third tooth to the first tooth, the first tooth closer to the front end and closer to the blade axis than the third tooth. The declined cutting edge portion includes at least one intermediate tooth between the third tooth and the first tooth.

Implementations of this aspect may include one or more of the following features. The at least one intermediate tooth may include at least one bump tooth having a tooth height less than a tooth height of the third tooth. The at least one intermediate tooth may have a configuration different from the third tooth. The at least one intermediate tooth may include at least one full size tooth having a configuration that is substantially similar to the third tooth. The first tooth may be located at approximately the location of a shoe of a reciprocating saw to which the saw blade is configured to be coupled when the saw blade is at a furthest extension of its saw stroke. The tang may include a hole and the first tooth may be located approximately 0.75 inches to approximately 1.50 inches from a center of the hole.

In another aspect, a reciprocating saw blade includes an elongated blade body extending along a blade axis and having a rear end, a front end, a cutting edge having a plurality of teeth and extending between the rear end and the front end, and a non-cutting edge opposite the cutting edge and extending between the rear end and the front end. A tang defines a hole, is coupled to the rear end, and is configured to be received in a blade holder of a powered reciprocating saw. The cutting edge includes (a) an inclined cutting edge portion extending away from the blade axis and toward the front end at an acute first angle to the blade axis, the inclined cutting edge portion extending from a first tooth to a second tooth, the first tooth closer to the rear end and closer to the blade axis than the second tooth; and (b) a declined cutting edge portion extending toward the blade axis and toward the front end at an acute second angle that is greater than the first angle, the declined cutting edge extending from a third tooth to the first tooth, the first tooth closer to the front end and closer to the blade axis than the third tooth. The first tooth is located approximately 0.75 inches to approximately 1.50 inches from a center of the hole such that the first tooth is located at approximately a location of a shoe of a reciprocating saw to which the saw blade is configured to be coupled when the saw blade is at a furthest extension of its saw stroke.

Implementations of this aspect may include one or more of the following features. The declined cutting edge portion may include at least one intermediate tooth between the third tooth and the first tooth. The at least one intermediate tooth may include at least one bump tooth having a tooth height less than a tooth height of the third tooth. The inclined cutting edge portion may have a first length and the declined cutting edge portion may have a second length that is less than the first length.

In another aspect, a reciprocating saw blade includes an elongated blade body extending along a blade axis and having a rear end, a front end with a cutting tip, a cutting edge having a plurality of cutting teeth extending from the rear end to the front end, and a non-cutting edge opposite the cutting edge and extending from the rear end to the front end. A tang is coupled to the rear end and configured to be received in a blade holder of a powered reciprocating saw. The tang extends away from the blade axis as it extends away from the rear end at an acute tang angle to the blade axis. The cutting edge comprises an inclined cutting edge portion that rises away from the blade axis as it extends toward the front end at an acute first angle to the blade axis, and a declined cutting edge portion that falls toward the blade axis as it extends toward the front end at an acute second angle to the blade axis. The second angle is greater than the first angle. In other implementations, the second angle may be greater than the tang angle, and the tang angle may be greater than the first angle.

Implementations of this aspect may include one or more of the following features. The tang angle may range from 3° to 6°. The cutting edge may include a plurality of the inclined cutting edge portions and a plurality of the declined cutting edge portions. The cutting edge may have a repeating pattern that alternates between the inclined cutting edge portions and the declined cutting edge portions. The inclined cutting edge portion may extend from a first tooth to a second tooth and the declined cutting portion may extend from the second tooth to a third tooth, the first tooth closer to the blade axis than the second tooth. The cutting edge may have an intended working zone and the first tooth may be located at the rearmost end of the working zone at approximately the location of a shoe of a reciprocating saw to which the saw blade is coupled when the blade is at the furthest extension of its saw stroke. In one implementation, the first tooth may be located approximately 0.75 inches to approximately 1.50 inches from a hole in the tang. In other implementations, the first tooth may be located at approximately a midpoint of the working zone. The first tooth may be located at approximately 35% to 55% of a total length of the saw blade from an opening in the tang.

The cutting edge may further include a parallel cutting edge portion between the inclined cutting edge portion and the declined cutting edge portion, the parallel cutting edge portion being parallel to the blade axis. The inclined cutting edge portion may have a first length and may rise by an amplitude away from the blade axis. The declined cutting edge portion may have a second length and may fall by the amplitude toward the blade axis. The parallel cutting edge portion may have a third length, the second length less than the third length, and the third length less than the first length. The first length may be from 0.65 inches to 1.15 inches, the second length may be from 0.04 inches to 0.35 inches (e.g., from 0.04 inches to 0.08 inches or from 0.08 inches to 0.35 inches), the third length may be from 0.25 inches to 0.50 inches (e.g., 0.25 inches to 0.45 inches), and the amplitude may be from 0.01 inches to 0.03 inches. The inclined cutting edge portion may extend from a first tooth to a second tooth. The parallel cutting edge portion may extend from the second tooth to a third tooth. The declined cutting edge portion may extend from the third tooth to a fourth tooth, the first tooth closest to the blade axis and the second and third teeth furthest from the blade axis. The cutting edge may have an intended working zone and the first tooth may be located at the rearmost end of the working zone at approximately the location of a shoe of a reciprocating saw to which the saw blade is coupled when the blade is at the furthest extension of its saw stroke. In one implementation, the first tooth may be located approximately 0.75 inches to approximately 1.50 inches from a hole in the tang. In other implementations, the first tooth may be located at approximately a midpoint of the working zone. The first tooth may be located at approximately 35% to 55% of a total length of the saw blade from an opening in the tang.

The cutting edge may further include a non-cutting bump tooth in the declined cutting edge portion. The bump tooth may have a height that is less than a height of each of the plurality of cutting teeth, the bump tooth configured to receive impact loads on the cutting edge. At least some of the cutting teeth may be set in a pattern that includes set teeth. The bump tooth may be unset.

The second angle may be at least 3 times larger than the first angle. The tang angle may be from 3° to 6°, the first angle may be from 0.50° to 3° and the second angle may be from 7.5° to 35°. The inclined cutting edge portion may have a first length and may rise by an amplitude away from the blade axis. The declined cutting edge portion may have a second length and may fall by the amplitude toward the blade axis. The second length may be less than the first length. The second length may be less than or equal to a length of two of the cutting teeth. The first length may be at least 8 times longer than the second length. The first length may be from 0.65 inches to 1.15 inches, the second length may be 0.04 inches to 0.08 inches, and the amplitude may be from 0.01 inches to 0.03 inches.

The inclined cutting edge portion may have first a plurality of teeth having rake faces facing toward the rear end and the declined cutting edge portion may have at least one tooth having a rake face facing toward the rear end. The inclined cutting edge portion may have a plurality of teeth having rake faces facing toward the rear end and the declined cutting edge portion may have at least one tooth having a rake face facing toward the front end. The inclined cutting edge portion may have a curved profile. The cutting edge may further include a tip cutting edge portion adjacent the cutting tip. The cutting teeth may be set in a pattern that includes a five tooth sequence comprising an unset tooth, a left light set tooth, a right light set tooth, a left heavy set tooth, and a right heavy set tooth.

In another aspect, a reciprocating saw blade includes an elongated blade body extending along a blade axis and having a rear end, a front end with a cutting tip, a cutting edge extending between the rear end and the front end, and a non-cutting edge opposite the cutting edge and extending between the rear end and the front end. A tang is coupled to the rear end and configured to be received in a blade holder of a powered reciprocating saw. The cutting edge includes an inclined cutting edge portion that rises away from the blade axis as it extends toward the front end at an acute first angle to the blade axis, a declined cutting edge portion that falls toward the blade axis as it extends toward the front end at an acute second angle to the blade axis, and a parallel cutting edge portion extending between the inclined cutting edge portion and the declined cutting edge portion parallel to the blade axis. The second angle is greater than the first angle.

Implementations of this aspect may include one or more of the following features. The cutting edge may include a plurality of the inclined cutting edge portions, a plurality of the declined cutting edge portions, and a plurality of the parallel cutting edge portions. The cutting edge may have a repeating sequence of an inclined cutting edge portion, followed by a parallel cutting edge portion, followed by a declined cutting edge portion. The inclined cutting edge portion may have a first length and may rises by an amplitude away from the blade axis. The declined cutting edge portion may have a second length and may fall by the amplitude toward the blade axis. The parallel cutting edge portion may have a third length, the second length may be less than the third length, and the third length may be less than the first length. The first length may be from 0.65 inches to 1.15 inches, the second length may be 0.04 inches to 0.35 inches (e.g., 0.04 inches to 0.08 inches or 0.08 to 0.35 inches), the third length is from 0.25 inches to 0.50 inches (e.g., 0.25 inches to 0.45 inches), and the amplitude may be from 0.01 inches to 0.03 inches. The inclined cutting edge portion may extend from a first tooth to a second tooth. The parallel cutting edge portion may extend from the second tooth to a third tooth. The declined cutting edge portion may extend from the third tooth to a fourth tooth. The first tooth may be closest to the blade axis and the second and third teeth may be furthest from the blade axis. The cutting edge may have an intended working zone and the first tooth may be located at the rearmost end of the working zone at approximately the location of a shoe of a reciprocating saw to which the saw blade is coupled when the blade is at the furthest extension of its saw stroke. In one implementation, the first tooth may be located approximately 0.75 inches to approximately 1.50 inches from a hole in the tang. In other implementations, the first tooth may be located at approximately a midpoint of the working zone. The first tooth may be located at approximately 35% to 55% of a total length of the saw blade from an opening in the tang.

The cutting edge may further include a non-cutting bump tooth in the declined cutting edge portion. The bump tooth may have a height that is less than a height of each of the plurality of cutting teeth. The bump tooth may be configured to receive impact loads on the cutting edge. The second angle may be at least 3 times larger than the first angle. The first angle may be from 0.50° to 3° and the second angle may be from 3° to 35° (e.g., from 3° to 10° or from 7.5° to 35°). The second length may be less than or equal to a length of two of the cutting teeth. The first length may be at least 8 times longer than the second length.

The inclined cutting edge portion may have a plurality of teeth having rake faces facing toward the rear end and the declined cutting edge portion has at least one tooth having a rake face facing toward the rear end. The inclined cutting edge portion may have a plurality of teeth having rake faces facing toward the rear end and the declined cutting edge portion may have at least one tooth having a rake face facing toward the front end. The inclined cutting edge portion may have a curved profile. The cutting edge may further include a tip cutting edge portion adjacent the cutting tip. The cutting teeth may be set in a pattern that includes a five tooth sequence comprising an unset tooth, a left light set tooth, a right light set tooth, a left heavy set tooth, and a right heavy set tooth.

In another aspect, a reciprocating saw blade may include an elongated blade body extending along a blade axis and having a rear end, a front end with a cutting tip, a cutting edge having a plurality of cutting teeth extending from the rear end to the front end, and a non-cutting edge opposite the cutting edge and extending from the rear end to the front end. A tang is coupled to the rear end and configured to be received in a blade holder of a powered reciprocating saw. The tang extends away from the blade axis as it extends away from the rear end. The cutting edge includes an inclined cutting edge portion that rises away from the blade axis as it extends toward the front end at an acute first angle to the blade axis, and a declined cutting edge portion that falls toward the blade axis as it extends toward the front end at an acute second angle to the blade axis. The second angle is greater than the first angle. In other implementations, the second angle is greater than the tang angle, and the tang angle is greater than the first angle. The cutting edge further includes a non-cutting bump tooth in the declined cutting edge portion that is configured to receive impact loads on the cutting edge.

Implementations of this aspect may include one or more of the following features. The cutting edge may include a plurality of the inclined cutting edge portions and a plurality of the declined cutting edge portions. The cutting edge may have a repeating pattern that alternates between the inclined cutting edge portions and the declined cutting edge portions. The inclined cutting edge portion may extend from a first tooth to a second tooth and the declined cutting portion may extend from the second tooth to a third tooth, the first tooth closer to the blade axis than the second tooth. The cutting edge may have an intended working zone and the first tooth may be located at the rearmost end of the working zone at approximately the location of a shoe of a reciprocating saw to which the saw blade is coupled when the blade is at the furthest extension of its saw stroke. In one implementation, the first tooth may be located approximately 0.75 inches to approximately 1.50 inches from a hole in the tang. In other implementations, the first tooth may be located at approximately a midpoint of the working zone. The first tooth may be located at approximately 35% to 55% of a total length of the saw blade from an opening in the tang.

The cutting edge may further include a parallel cutting edge portion between the inclined cutting edge portion and the declined cutting edge portion. The parallel cutting edge portion may be parallel to the blade axis. The inclined cutting edge portion may have a first length and may rise by an amplitude away from the blade axis. The declined cutting edge portion may have a second length and may fall by the amplitude toward the blade axis. The parallel cutting edge portion may have a third length, the second length less than the third length, and the third length less than the first length. The first length may be from 0.65 inches to 1.15 inches, the second length may be 0.04 inches to 0.35 inches (e.g., 0.04 to 0.08 inches or 0.08 to 0.35 inches), the third length may be from 0.25 inches to 0.50 inches (e.g., 0.25 inches to 0.45 inches), and the amplitude may be from 0.01 inches to 0.03 inches. The inclined cutting edge portion may extend from a first tooth to a second tooth, the parallel cutting edge portion may extend from the second tooth to a third tooth, and the declined cutting edge portion may extend from the third tooth to a fourth tooth, the first tooth being closest to the blade axis and the second and third teeth being furthest from the blade axis. The cutting edge may have an intended working zone and the first tooth may be located at the rearmost end of the working zone at approximately the location of a shoe of a reciprocating saw to which the saw blade is coupled when the blade is at the furthest extension of its saw stroke. In one implementation, the first tooth may be located approximately 0.75 inches to approximately 1.50 inches from a hole in the tang. In other implementations, the first tooth may be located at approximately a midpoint of the working zone. The first tooth may be located at approximately 35% to 55% of a total length of the saw blade from an opening in the tang.

The second angle may be at least 3 times larger than the first angle. The tang angle may be from 3° to 6°, the first angle may be from 0.50° to 3° and the second angle may be from 3° to 35° (e.g., from 3° to 10° or from 7.5° to 35°. The inclined cutting edge portion may have a first length and rise by an amplitude away from the blade axis. The declined cutting edge portion may have a second length and may fall by the amplitude toward the blade axis, the second length less than the first length. The second length may be less than or equal to a length of two of the cutting teeth. The first length may be at least 2 times longer (e.g., at least 8 times longer) than the second length. The first length may be from 0.65 inches to 1.15 inches, the second length may be 0.04 inches to 0.35 inches (e.g., 0.04 inches to 0.08 inches or 0.08 inches to 0.35 inches), and the amplitude may be from 0.01 inches to 0.03 inches.

The inclined cutting edge portion may have a plurality of teeth having rake faces facing toward the rear end and the declined cutting edge portion may have at least one tooth having a rake face facing toward the rear end. The inclined cutting edge portion may have a plurality of teeth having rake faces facing toward the rear end and the declined cutting edge portion may have at least one tooth having a rake face facing toward the front end. The inclined cutting edge portion may have a curved profile. The cutting edge may further comprise a tip cutting edge portion adjacent the cutting tip. At least some of the cutting teeth may be set in a pattern that includes set teeth, with the bump tooth unset. The cutting teeth may be set in a pattern that includes a five tooth sequence comprising an unset tooth, a left light set tooth, a right light set tooth, a left heavy set tooth, and a right heavy set tooth.

Advantages may include one or more of the following. The inclined and declined cutting edge portions on the reciprocating saw blades facilitate cutting at more aggressive angles relative to the tang than could otherwise be achieved by only increasing the tang angle. This markedly improves life and also unexpectedly improves cutting speed, while also reducing poor cut quality and vibration associated with a larger tang angle. The bump teeth also receive impact loads that occur when the blade is moving backwards during reciprocation, which reduce the overall loading on the cutting teeth, further improving life, while at the same time unexpectedly improving cutting speed. In addition, the reciprocating saw blades in this application achieve unexpectedly less vibration when engaged in tip cutting or unsupported cutting (i.e., cutting with the front end portion of the saw blade or without the shoe resting on the workpiece) than existing reciprocating saw blades. The reciprocating saw blades in this application also reduce damage to the teeth from rubbing against the shoe of a powered reciprocating saw. These and other advantages and features will be apparent from the description and the drawings.

BRIEF DESCRIPTION OF THE DRAWINGS

FIGS. 4F and 4G are close up views of other embodiments of bump teeth that may be incorporated into the saw blades of FIGS. 1-4E.

FIG. 5 is a plan view of another embodiment of a reciprocating saw blade.

FIG. 6 is a close up view of a portion of the cutting edge of the saw blade of FIG. 5.

DETAILED DESCRIPTION

Figure 1:
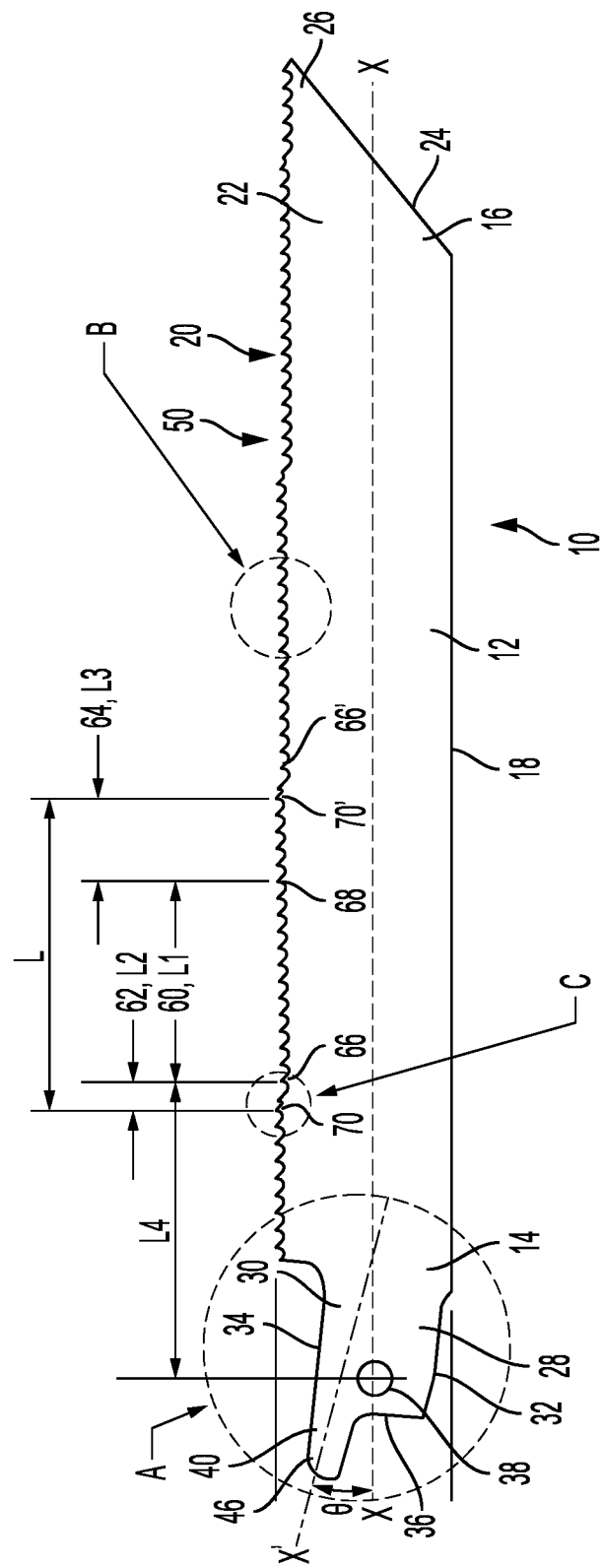
FIG. 1 is a plan view of an embodiment of a reciprocating saw blade.
Figure 2:
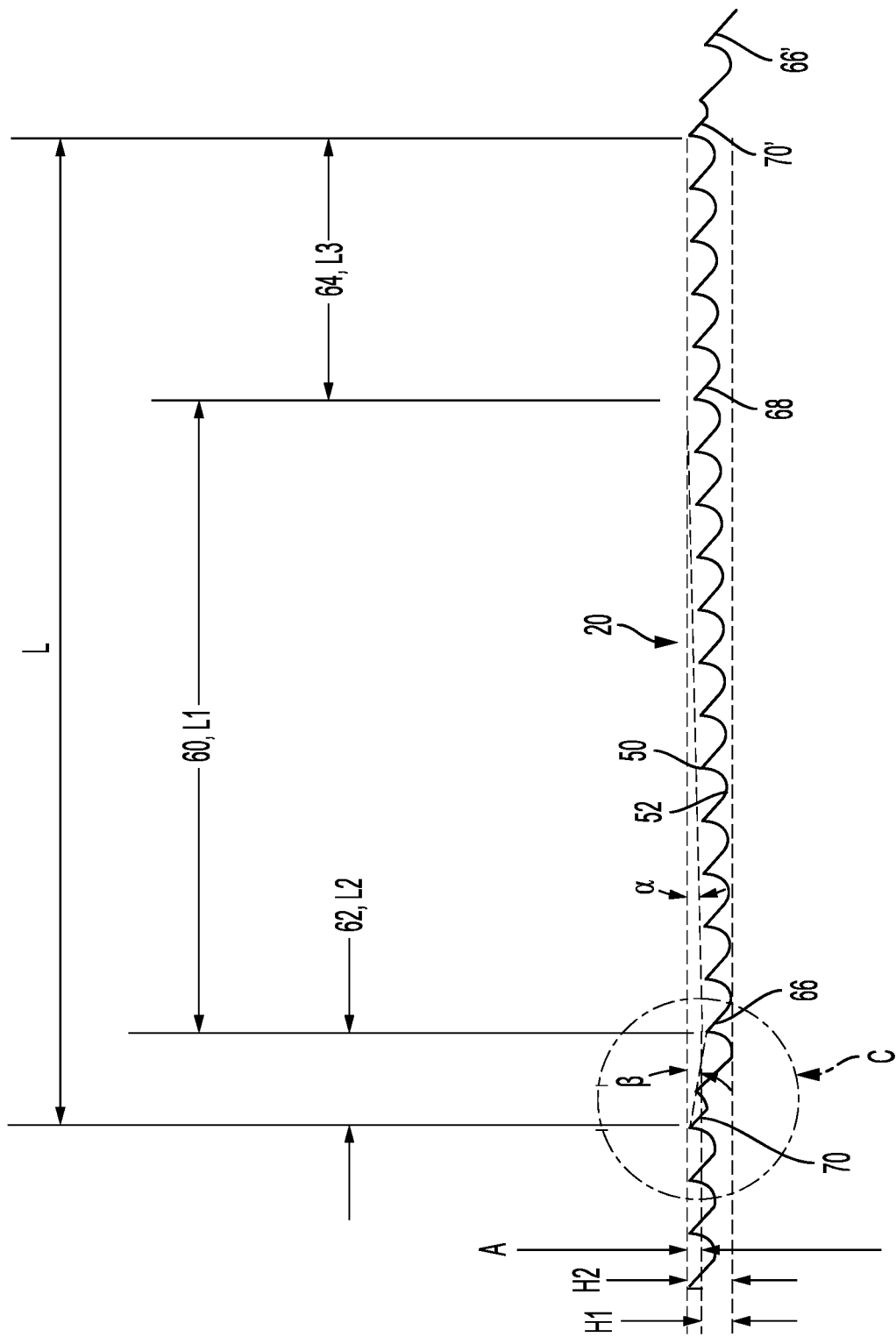
FIG. 2 is a close up view of a portion of the cutting edge of the saw blade of FIG. 1.
Figure 3:
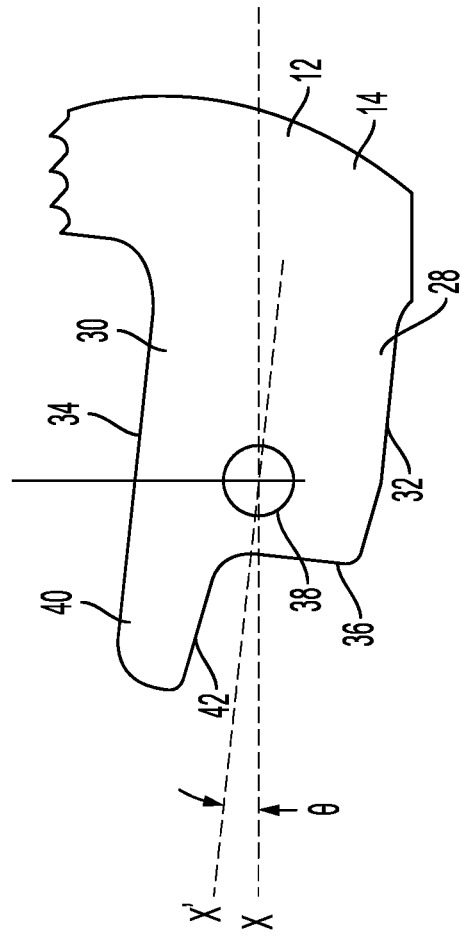
FIG. 3 is a close up view of circled portion A in FIG. 1, showing the tang of the saw blade.

Referring to FIGS. 1-3, in an embodiment, a reciprocating saw blade 10 includes an elongated blade body 12 extending along a blade axis X. The elongated body 12 has a rear end 14, a front end 16, a cutting edge 20 extending between the rear end 14 and the front end 16, and a non-cutting back edge 18 opposite the cutting edge 20 and extending between the rear end 14 and the front end 16, generally parallel to the blade axis X and to the cutting edge 20. The front end 16 optionally includes a cutting tip 22. In the illustrated embodiment, the cutting tip 22 includes an angled front edge 24 that extends from the back edge 18 to the cutting edge 20 and that intersects the cutting edge 20 at a tip 26.

A tang 28 is coupled to and extends rearward from the rear end 14 of the body 12 along a tang axis X'. The tang 28 is configured to be received in a blade holder of a powered reciprocating saw (not shown). The tang 28 includes a body portion 30 defined by a first bottom edge 32, a substantially parallel top edge 34, and a rear edge 36. The top edge 34 and the bottom edge 32 extend in the rearward direction from the body 12 along the tang axis X' at a tang angle Θ relative to the blade axis X. The tang angle Θ may be an acute angle (e.g., approximately 3° to approximately 6° degrees), or, in other embodiments may be an angle of 0° so that the tang axis X' is aligned with or parallel to the blade axis X. A circular opening or hole 38 extends through the body portion 30 of the tang 28. The tang 28 further includes a panhandle portion 40 extending in the rearward direction from the body portion 30 and defined by the top edge 34, a second bottom edge 44 substantially parallel to the top edge 34, and a rear edge 46 extending between the top edge 34 and the second bottom edge 44.

The cutting edge 20 includes a plurality of cutting teeth 50 separated by a plurality of gullets 52. Each of the cutting teeth 50 includes a rake face 54 extending upward from a back end of the gullet 52 and facing toward the rear end 14, a relief face 56 extending downward toward a front of the gullet 52 and facing toward the front end 16, and a pointed cutting tip 58 where the rake face 54 and relief face 56 intersect. The rake face 54 is disposed at a rake angle ω (e.g., approximately −2° to approximately 5°) relative to a line Y perpendicular to the blade axis X. The relief face is disposed at a relief angle relative to a line Z parallel to the blade axis X. In the illustrated embodiment the relief face 56 includes a primary relief angle φ1 (e.g., approximately 17° to approximately 40°) and a larger secondary relief angle φ2 (e.g., approximately 30° to approximately 50°), although it should be understood that the relief face 56 may have fewer or more relief angles. Each gullet 52 has a depth D (measured from a tooth tip to the base of the gullet), which may be constant or variable among the gullets 52. Each tooth 50 has a height (measured from a line L parallel to the blade axis and tangent to the base of the gullet to the tooth tip), which may be constant or variable among the teeth. The teeth 50 may also be spaced by a tooth pitch (e.g., 4 teeth per inch (tpi) to 32 tpi), which may be constant or variable among the teeth. Teeth 50 may also be set in a repeating pattern that includes set teeth and/or unset teeth (e.g., left-right-left-right, unset-left-right, unset-light left-light right-heavy left-heavy right, etc.). In one implementation, circle B identifies a sequence of five cutting teeth 52 having a variable height, a constant spacing or tooth pitch, and set in a sequence comprising an unset tooth, a left light set tooth, a right light set tooth, a left heavy set tooth, and a right heavy set tooth. The cutting teeth 52 may be similar to the teeth on the saw blades disclosed in U.S. Pat. Nos. 8,210,081, 9,248,518, and 9,375,796, each of which is incorporated by reference.

The cutting edge 20 includes at least one inclined cutting edge portion 60, at least one declined cutting edge portion 62, and at least one parallel cutting edge portion 64. The cutting edge portions 60, 62, 64 are arranged in a repeating sequence of an inclined cutting edge portion 60, followed by a parallel cutting edge portion 64, followed by a declined cutting edge portion 62, and so on. Stated differently, the cutting edge portions 60, 62, 64 are arranged in a repeating sequence of a declined cutting edge portion 62, followed by an inclined cutting edge portion 60, followed by a parallel cutting edge portion 64, and so on. Each inclined cutting edge portion 60 extends from a first tooth 66 to a second tooth 68 (closer to the front end 16 than the first tooth 66) and rises away from the blade axis X as it extends toward the front end 16 at an acute first angle α to the blade axis X, such that the first tooth 66 is closer to the blade axis X than the second tooth 68. Each declined cutting edge portion 62 extends from a third tooth 70 to the first tooth 66 of the following inclined cutting edge portion 60 (closer to the front end 16 than the third tooth 70). Each declined cutting edge portion 62 falls toward the blade axis as it extends toward the front end 16 at an acute second angle β to the blade axis X, such that the first tooth 66 is closer to the blade axis X than the third tooth 70. Each parallel cutting edge portion 64 extends from the second tooth 68 of the preceding inclined cutting edge portion 60 to the next third tooth 70' of the following declined cutting edge portion 62, between the preceding inclined cutting edge portion 60 and the following declined cutting edge portion 62, substantially parallel to the blade axis X.

The first tooth 66 of the first inclined cutting edge portion 60 along the length of the cutting edge 20 is positioned a distance L4 from the center of the hole 38 in the tang 30. The distance L4 serves to constrain the location of the repeating declined cutting edge portions 62, inclined cutting edge portions 60, and parallel cutting edge portions 64 relative to the blade holder and shoe of the reciprocating saw that is holding the reciprocating saw blade. It has been discovered that life and cutting speed of the reciprocating saw blade can be optimized when the first tooth 66 is positioned approximately at the location of a shoe on the reciprocating saw that is holding the saw blade when the blade is at the furthest extension of its saw stroke. Because shoes on different reciprocating saws are positioned at different distances from the blade holder, the distance L4 of the first tooth 66 from the tang hole 38 is selected to work optimally with most commercially available reciprocating saws. In certain embodiments the distance L4 may be approximately 0.75 inches to approximately 1.50 inches. In other implementations, the first tooth may be located at approximately a midpoint of the working zone. The first tooth may be located at approximately 35% to 55% of a total length of the saw blade from an opening in the tang.

The tip of each tooth is located at a vertical distance that is measured from a line L that is parallel to the blade axis X and that is tangent to the base of the gullet of the lowest tooth to the tip of each tooth. In an example, the first tooth 66 of the inclined cutting edge portion 60 has a first vertical distance H1 that is the smallest of all the teeth (e.g., approximately 0.015 inches to approximately 0.125 inches). The second and third teeth 68, 70 each have a second vertical distance H2 that is the largest of all the teeth (e.g., approximately 0.025 inches to approximately 0.155 inches). The difference between the largest vertical distance H2 and the smallest vertical distance H1 is referred to as the amplitude A (which is also the vertical distance between the tips of the highest and lowest teeth on the saw blade). In an embodiment, the amplitude A may be approximately 0.01 inches to approximately 0.03 inches, e.g., approximately 0.02 inches).

The second angle β is greater (e.g., at least 2 times greater), and may be significantly greater (e.g., at least 3 times greater), than the first angle α. For example, the first angle α may be from approximately 0.50° to approximately 3° and the second angle β may be from approximately 3° to approximately 35°, e.g., approximately 7.5° to approximately 35° or approximately 3° to approximately 10°. The inclined cutting edge portion 60 has a first length L1 and rises relative to the blade axis X by the amplitude A from the first tooth 66 (having the lowest vertical distance H1) to the second tooth 68 (having the highest vertical distance H2). The declined cutting edge portion 64 has a second length L2 and falls toward the blade axis X by the amplitude A from the third tooth 68 (having the highest vertical distance H2)

to the next first tooth 66 (having the lowest vertical distance H1). The parallel cutting edge portion 64 has a third length L3 and has teeth all having the same vertical distance H2 as the second and third teeth 66, 68. A given sequence of a declined cutting edge portion 62, an inclined cutting edge portion 60, and a parallel cutting edge portion 64, may have an overall length L.

The second length L2 of the declined cutting edge portion 62 is shorter (and may be significantly shorter) than the first length L1 of the inclined cutting edge portion 60. The second length L2 may also be shorter than the third length L3 of the parallel cutting edge portion 62. Also, the length L3 of the parallel cutting edge portion 64 may be less than the first length L1 of the inclined cutting edge portion 60. For example, the first length L1 may be at least 2 times longer (e.g., at least 8 times longer) than the second length L2. In one implementation, the first length L1 may be the length of 6 to 12 teeth or from approximately 0.5 inches to approximately 1.5 inches (e.g., approximately 0.9 inches), the second length L2 may be the length of 1 to 5 teeth (e.g., 2 to 5 teeth), or from approximately 0.04 inches to approximately 0.50 inches (e.g., approximately 0.06 to approximately 0.08 inches), and the third length L3 may be the length of 3 to 7 teeth, from approximately 0.25 inches to approximately 0.75 inches (e.g., approximately 0.35 inches to approximately 0.50 inches). The amplitude A of the inclined cutting edge portion 60 and the amplitude A of the declined cutting edge portion 62 may be the same or different. In an example, the amplitudes A are the same, and may be from approximately 0.01 inches to approximately 0.03 inches (e.g., approximately 0.02 inches). The repeating tooth pattern on the cutting edge 20 may further improve tip cutting or unsupported cutting in which the shoe of the saw is not resting on the workpiece and/or a tip portion 76 of the cutting edge 20 is used to cut the workpiece.

Figure 4A:
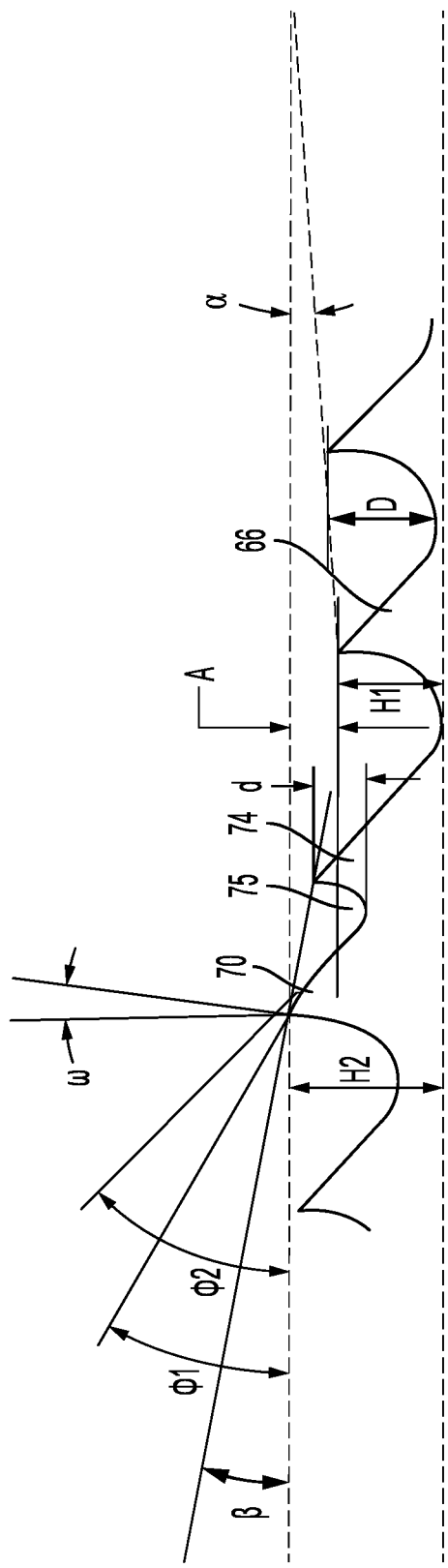
FIG. 4A is a close up view of circled portion C in FIGS. 1 and 2, showing one of the declined cutting edge portions and bump teeth of the saw blade of FIG. 1.

Referring also to FIG. 4A, the declined cutting edge portion 62 further may include one or more intermediate teeth between the third tooth 70 and the first tooth 66. The one or more intermediate teeth may include one or more bump teeth 74. Each of the bump teeth 74 may be preceded by a bump gullet 75 and may have a gullet depth or tooth height d that is less than (e.g., significantly less than) the gullet depth or tooth height D of the remaining teeth on the saw blade. For example, the gullet depth d of the bump gullet 75 may be approximately 0.005 inches to approximately 0.060 inches (as compared to the gullet depth D of the gullets 52 of, e.g., approximately 0.015 inches to approximately 0.135 inches). The small gullet depths and tooth heights of the bump teeth 74 make them more robust. Thus, the bump teeth 74 are configured to receive impact loads on the cutting edge 20 that occur when the saw blade moves in the reverse direction, and the relative movement of the blade on the workpiece transitions from the inclined cutting edge portion 60 to the declined cutting edge portion 62. The length L2 of the declined cutting edge portion 62 is the horizontal distance between the tip of the highest tooth 70 and the tip of the lowest tooth 66.

Referring to FIGS. 4B-4E, other embodiments of the cutting edge 20 for the saw blade 10 each may include at least one inclined cutting edge portion 60, at least one declined cutting edge portion 62, and at least one parallel cutting edge portion 64. The cutting edge portions 60, 62, 64 are arranged in a repeating sequence of a declined cutting edge portion 62, followed by an inclined cutting edge portion 60, followed by a parallel cutting edge portion 64, and so on. Each inclined cutting edge portion 60 extends from a first tooth 66 (closer to the rear end 14) to a second tooth 68 (closer to the front end 16 than the first tooth 66) and rises away from the blade axis X as it extends toward the front end 16 at an acute first angle α to the blade axis X, such that the first tooth 66 is closer to the blade axis X than the second tooth 68. Each declined cutting edge portion 62 extends from a third tooth 70 (closer to the rear end 14) to the first tooth 66 of the following inclined cutting edge portion 60 (closer to the front end 16 than the third tooth 70). Each declined cutting edge portion 62 falls toward the blade axis as it extends toward the front end 16 at an acute second angle β to the blade axis X, such that the first tooth 66 is closer to the blade axis X than the third tooth 70. Each parallel cutting edge portion 64 extends from the second tooth 68 of the preceding inclined cutting edge portion 60 to a third tooth 70' of the following declined cutting edge portion, between the preceding inclined cutting edge portion 60 and the following declined cutting edge portion, generally parallel to the blade axis X.

In the embodiments of FIGS. 4B-4E, the second angle β is greater (e.g., at least 2 times greater), and may be significantly greater (e.g., at least 3 times greater), than the first angle α. For example, the first angle may be from approximately 0.50° to approximately 3° and the second angle may be from approximately 3° to approximately 10°. The cutting edge 20 has an amplitude A defined as the vertical distance between the tips of the second and third teeth 68, 70 and the tip of the first tooth 66. For example, the amplitude may be approximately 0.01 inches to approximately 0.03 inches (e.g., approximately 0.02 inches).

The inclined cutting edge portion 60 has a first length L1, e.g. approximately 0.7 inches to approximately 1.0 inches. The declined cutting edge portion 64 has a second length L2, e.g., approximately 0.1 inches to approximately 0.3 inches. The parallel cutting edge portion 64 has a third length L3, e.g., approximately 0.3 inches to approximately 0.4 inches. A given sequence of a declined cutting edge portion 62, an inclined cutting edge portion 60, and a parallel cutting edge portion 64, may have an overall length, e.g., approximately 1.2 inches to approximately 1.5 inches. The second length L2 of the declined cutting edge portion 62 is shorter (and may be significantly shorter) than the first length L1 of the inclined cutting edge portion 60 and the third length L3 of the parallel cutting edge portion 62. Also, the length L3 of the parallel cutting edge portion 64 may be less than the first length L1 of the inclined cutting edge portion 60.

In each of the embodiments of FIGS. 4B-4E, the first tooth 66 is positioned at a distance L4 from the center of the hole 38 in the tang 30. The distance L4 serves to constrain the location of the repeating declined cutting edge portions 62, inclined cutting edge portions 60, and parallel cutting edge portions 64 relative to the blade holder and shoe of the reciprocating saw that is holding the reciprocating saw blade. Generally, the first tooth 66 is positioned approximately at the location of a shoe on the reciprocating saw that is holding the saw blade when the blade is at the furthest extension of its saw stroke. Because shoes on different reciprocating saws are positioned at different distances from the blade holder, the distance L4 of the first tooth 66 from the tang hole 38 is selected to work optimally with most commercially available reciprocating saws. In certain embodiments the distance L4 may be approximately 0.75 inches to approximately 1.50 inches. In other implementations, the first tooth may be located at approximately a midpoint of the working zone. The first tooth may be located at approximately 35% to 55% of a total length of the saw blade from an opening in the tang.

Figure 4B:
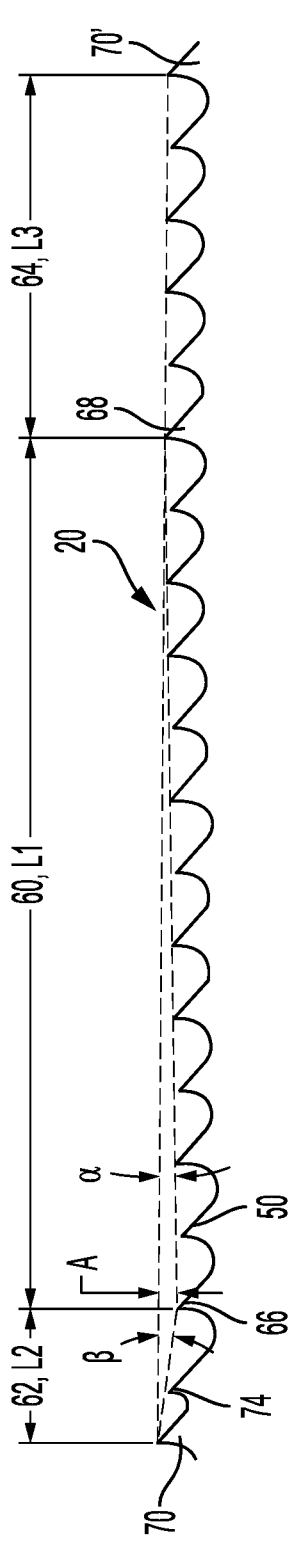
FIGS. 4B-4E are close up views of a portion of the cutting edge of alternative embodiments of the cutting edge of the saw blade of FIG. 1.
Figure 4C:
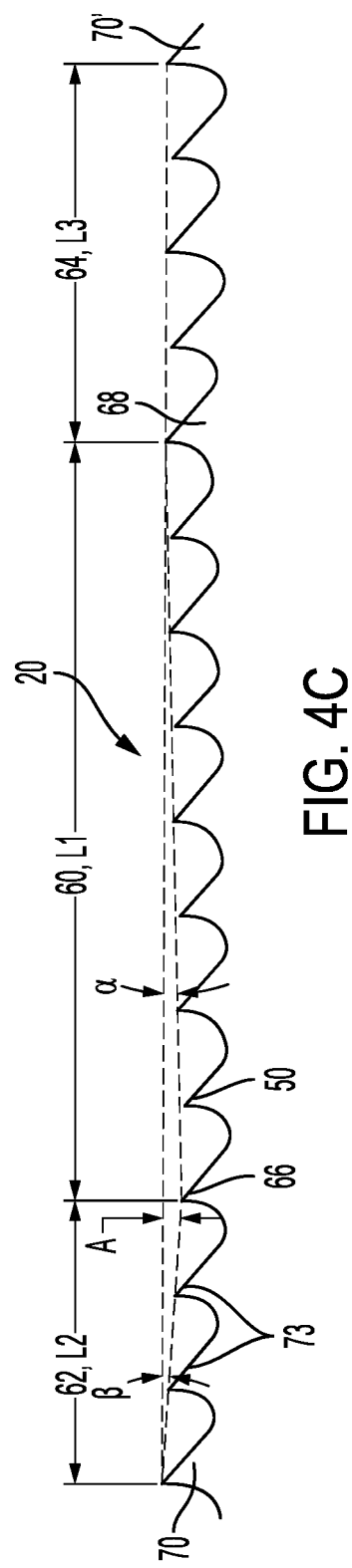
Figure 4D:
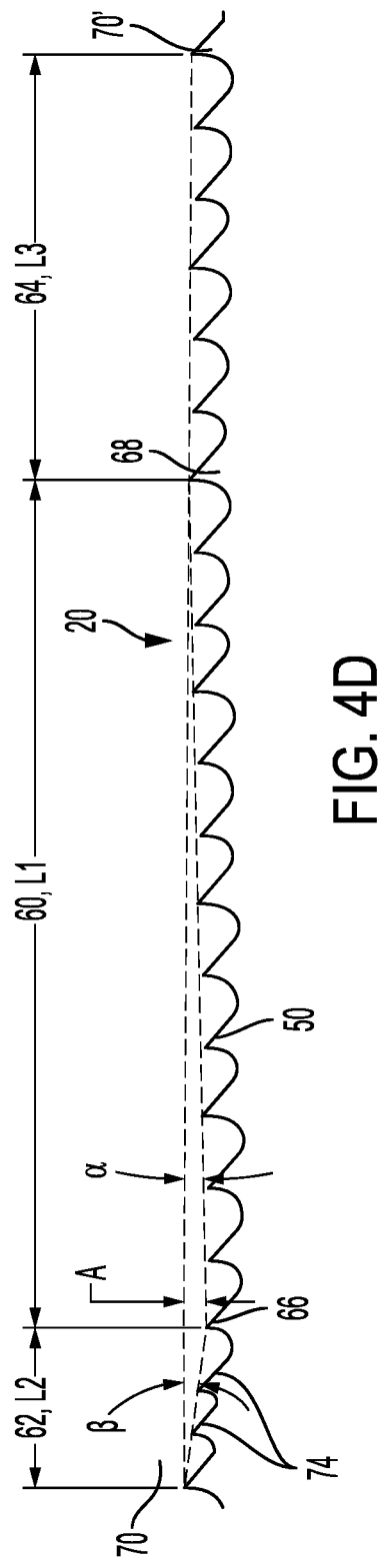
Figure 4E:
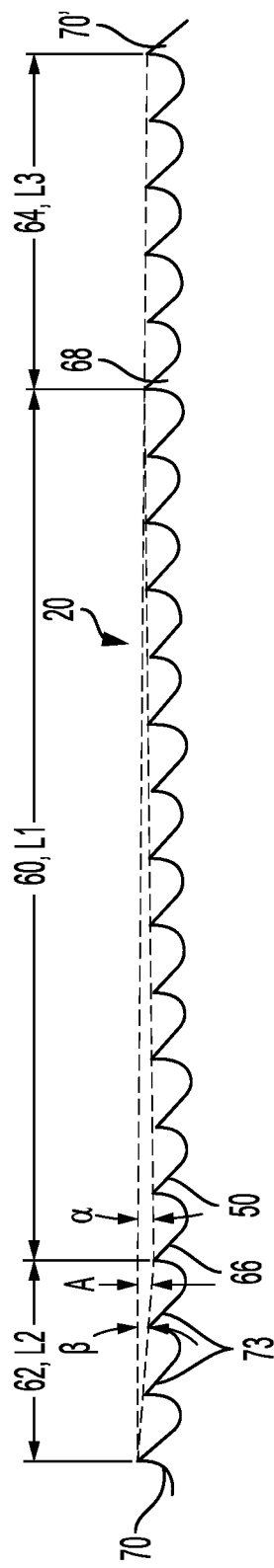

In the embodiments of FIGS. 4B-4E, the declined cutting edge portion 62 may include one or more intermediate teeth between the third tooth 70 and the following first tooth 66. In the embodiment of FIG. 4B, the declined cutting edge portion 62 includes one intermediate bump tooth 74 that has a smaller tooth height and gullet depth than the remaining teeth 50. In the embodiment of FIG. 4C, the declined cutting edge portion 62 includes two intermediate full size teeth 73 that may have substantially the same size and configuration as the remaining teeth 50. In the embodiment of FIG. 4D, the declined cutting edge. In the embodiment of FIG. 4D, the declined cutting edge portion 62 includes two intermediate bump teeth 74 that each have a smaller tooth height and gullet depth than the remaining teeth 50. In the embodiment of FIG. 4E, the declined cutting edge portion 62 includes two intermediate full size teeth 73 that may have substantially the same size and configuration as the remaining teeth 50. It should be understood that the intermediate teeth in the declined cutting edge portion 62 may include more than two teeth and may include a mixture of one or more bump teeth and one or more full size teeth.

In the embodiments of FIGS. 4A, 4B, and 4D, each bump tooth 74 may have a shape similar to the shape of the remaining cutting teeth 50, only with a smaller tooth height and gullet depth. In other embodiments, each bump tooth may have a different shape than the cutting teeth 50 in order to further take impact loads. For example, as shown in FIG. 4F, a bump tooth 74' may have a rake face 54' with a zero degree rake angle and a flat top portion 78' that is generally parallel to the blade axis X and that intersects the rake face 54' at a pointed cutting tip 58', and a rounded relief face 56'. In another example, as shown in FIG. 4G, a bump tooth 74" may have a rounded convex profile 82" with no cutting tip.

In the embodiments of FIGS. 1-4F and the other embodiments described in this application, it should be understood that the inclined cutting edge portion 60, the declined cutting edge portion 62, and the parallel cutting edge portion 64 each may include a plurality of teeth, and within each cutting edge portion, the teeth may have variable height, pitch, or set pattern so that the tips of consecutive teeth within each cutting edge portion are not precisely on a line that is inclined, declined, or parallel to the blade axis X, respectively. Rather, in each portion, the tips of the teeth, on average, will line substantially along a line that is inclined at the first acute angle α, declined at a second acute angle β, and substantially parallel to the blade axis.

For example, in the embodiment of FIGS. 1-4A, each inclined cutting edge portion 60 may have variable height teeth with the first tooth 66 having a higher tooth height and a following tooth having a lower tooth height, such that their tips are the same vertical distance from the blade axis X. However, on average, the tips of teeth of similar height in the inclined cutting edge portion 60 will increase in vertical distance from the blade axis X in a forward direction from the first tooth 66 toward the second tooth 68. By the same token, in each declined cutting edge portion 66, the third tooth 70 may have a lower tooth height than another following tooth, such that their tips are the same vertical distance from the blade axis X. However, on average, the tips of the teeth of similar tooth height in the declined cutting edge section will decrease in vertical distance from the blade axis X in a forward direction from the third tooth 70 toward the first tooth 66. Similarly, in the parallel cutting edge portion 64, the second tooth 68 at the rear end of the parallel cutting edge portion may have a different height than the next third tooth 70' or than one or more of the intermediate teeth in the parallel cutting edge portion, such that their tips are at different vertical distances from the blade axis X. However, on average, teeth of similar height in the parallel cutting edge portion 64 will have their tips generally aligned along a line that is substantially parallel to the blade axis X. It should be understood that these variations in tooth height, pitch, and set pattern may apply in the other embodiments described below and are within the scope of the claims.

Referring to FIGS. 5-6, in another embodiment, a reciprocating saw blade 110 includes an elongated blade body 112 extending along a blade axis X. The elongated body 112 has a rear end 114 with a tang 128 extending rearward from the rear end 114, a front end 116, a cutting edge 120 with cutting teeth 150 extending between the rear end 114 and the front end 116, and a non-cutting back edge 118 opposite the cutting edge 120 and extending between the rear end 114 and the front end 116, generally parallel to the blade axis and to the cutting edge 120. The reciprocating saw blade 110 is similar to the reciprocating saw blade 10 of FIGS. 1-3, except for the configuration of the cutting edge 120.

The cutting edge 120 includes an inclined cutting edge portion 160, a declined cutting edge portion 162, and a cutting tip portion 176, similar to the inclined cutting edge portion 60, declined cutting edge portion 62, and cutting tip portion 76 of the saw blade 10. However, unlike the saw blade 10, the cutting edge 120 of the saw blade 110 does not have a parallel cutting edge portion between the inclined and declined cutting edge portions. Each inclined cutting edge portion 160 extends from a first tooth 166 (closer to the rear end 114) to a second tooth 168 (closer to the front end 116) and rises away from the blade axis X as it extends toward the front end 116 at an acute first angle α1 to the blade axis X, such that the first tooth 166 is closer to the blade axis than the second tooth 168 (possibly with variations in tooth height, pitch, and set pattern as described above with respect to FIGS. 1-4F). The declined cutting edge portion 162 extends from the second tooth 168 to a first tooth 166' of the next inclined cutting edge portion (closer to the front end 116) and falls toward the blade axis as it extends toward the front end 116 at an acute second angle β1 to the blade axis X, such that the first tooth 166 is closer to the blade axis than the second tooth 168 (possibly with variations in tooth height, pitch, and set pattern as described above with respect to FIGS. 1-4F). In an example, the first tooth 166 may be the same distance from the blade axis, while the second tooth 168 may be furthest from the blade axis (possibly with variations in tooth height, pitch, and set pattern as described above with respect to FIGS. 1-4F). As shown by the solid lines 184 and 186 the tips of the cutting teeth 150 in the inclined cutting edge portion 160 and the declined cutting edge portion 162 are arranged in a straight profile with the tips of the teeth generally disposed along substantially straight lines 184, 186 (possibly with variations in tooth height, pitch, and set pattern as described above with respect to FIGS. 1-4F). The cutting edge 120 may include a plurality of the inclined cutting edge portions 160 and a plurality of the declined cutting edge portions 162, arranged in a repeating sequence of an inclined cutting edge portion 160, followed by a declined cutting edge portion 162. The repeating tooth pattern on the cutting edge 20 may further improve tip cutting or unsupported cutting in which a tip portion 176 of the cutting edge 120 is used to cut the workpiece.

Like the saw blade 10, the second angle β1 is greater (e.g., at least 2 times greater), and may be significantly greater (e.g., at least 3 times greater), than the first angle α1. For example, the first angle may be from approximately 0.50° to approximately 3° and the second angle may be from approximately 3° to approximately 35°, e.g., approximately 7.5° to approximately 35° or approximately 3° to approximately 10°. The inclined cutting edge portion 160 has a first length L1 and rises by an amplitude A away from the blade axis X. The declined cutting edge portion 164 has a second length L2 and falls by an amplitude A toward the blade axis X. The second length L2 of the declined cutting edge portion 162 is shorter (and may be significantly shorter) than the first length L1 of the inclined cutting edge portion 160. In one implementation, the first length L1 may be the length of 6 to 24 teeth (e.g., approximately 6 to 12 teeth) or from approximately 0.5 inches to approximately 1.5 inches (e.g., approximately 0.9 inches) and the second length L2 may be the length of 1 to 8 teeth (e.g., approximately 2 to 5 or 2 to 8 teeth) or from approximately 0.04 inches to approximately 0.50 inches (e.g., approximately 0.06 to approximately 0.08 inches). The amplitude A of the declined cutting edge portion 162 may be the same or different than the amplitude A of the inclined cutting edge portion 160. In an example, the amplitudes A are the same, and may be from approximately 0.01 inches to approximately 0.03 inches (e.g., approximately 0.02 inches).

The first tooth 166 of the first inclined cutting edge portion 160 along the length of the cutting edge 120 is positioned a distance L4 from the center of the hole 138 in the tang 130. The distance L4 serves to constrain the location of the repeating declined cutting edge portions 162 and inclined cutting edge portions 160 relative to the blade holder and shoe of the reciprocating saw that is holding the reciprocating saw blade. It has been discovered that life and cutting speed of the reciprocating saw blade can be optimized when the first tooth 166 is positioned approximately at the location of a shoe on the reciprocating saw that is holding the saw blade when the blade is at the furthest extension of its saw stroke. Because shoes on different reciprocating saws are positioned at different distances from the blade holder, the distance L4 of the first tooth 166 from the tang hole 138 is selected to work optimally with most commercially available reciprocating saws. In certain embodiments the distance L4 may be approximately 0.75 inches to approximately 1.50 inches. In other implementations, the first tooth may be located at approximately a midpoint of the working zone. The first tooth may be located at approximately 35% to 55% of a total length of the saw blade from an opening in the tang.

Like the saw blade 10, the declined cutting edge portion 162 may further include one or more intermediate teeth between the second tooth 168 and the following first tooth 166. The one or more intermediate teeth may include one or more bump teeth 174 in the declined cutting edge portion 162. Each bump tooth 174 may have a tooth height and gullet depth that is less than the remaining teeth and may have a shape and configuration similar to one of the bump teeth 74, 74', and 74" shown in FIGS. 4A, 4F, and 4G, respectively. Each bump tooth 174 may be configured to receive impact loads on the cutting edge 120 that occur when the saw blade moves in the reverse direction, and the relative movement of the blade on the workpiece transitions from the inclined cutting edge portion 160 to the declined cutting edge portion 162.

Referring to FIG. 6, in other embodiments, as shown by the dashed lines 180, 182, the tips of the cutting teeth 150 on the inclined cutting edge portion 160 may be arranged in a slightly concave profile (dashed line 180) or a slightly convex profile (dashed line 182) with the tips of the teeth being disposed along the curved lines 180, 182 (possibly with variations in tooth height, pitch, and set pattern as described above with respect to FIGS. 1-4F). The curved and inclined cutting edge portions may facilitate cutting in a manner similar to curved reciprocating saw blades disclosed, e.g., in U.S. Pat. No. 9,757,807, which is incorporated by reference, but with more aggressive cutting performance.

Figure 7:
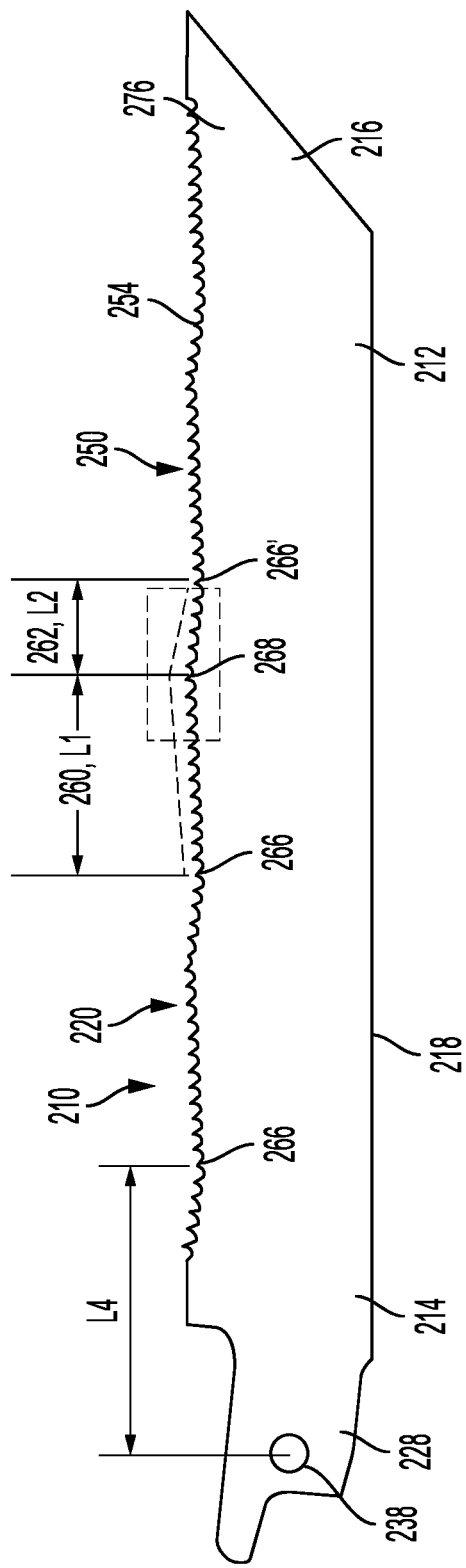
FIG. 7 is a plan view of another embodiment of a reciprocating saw blade.
Figure 8:
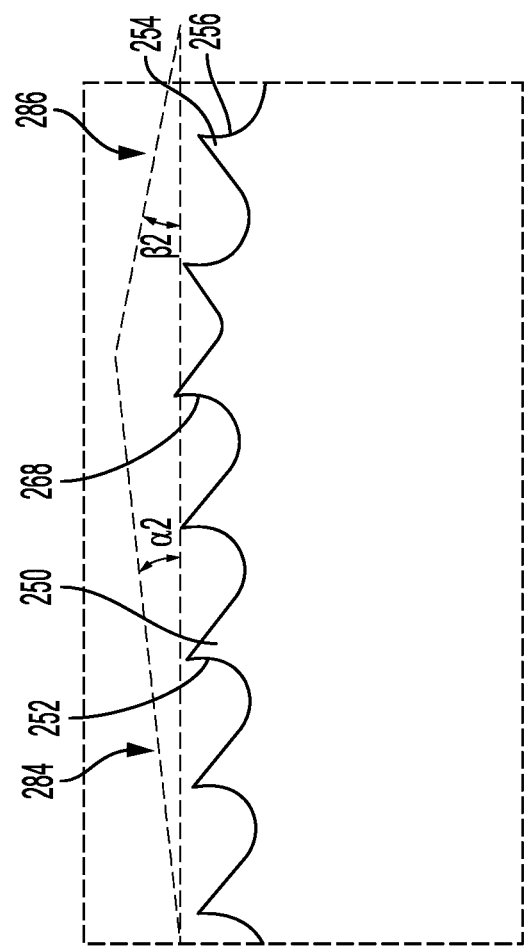
FIG. 8 is a close up view of a portion of the cutting edge of the saw blade of FIG. 7.

Referring to FIGS. 7-8, in another embodiment, a reciprocating saw blade 210 includes an elongated blade body 212 extending along a blade axis X. The elongated body 212 has a rear end 214 with a tang 228 extending rearward from the rear end 214, a front end 216, a cutting edge 220 extending between the rear end 214 and the front end 216, and a non-cutting back edge 218 opposite the cutting edge 220 and extending between the rear end 214 and the front end 216, generally parallel to the blade axis and to the cutting edge 220. The reciprocating saw blade 210 is similar to the reciprocating saw blade 110 of FIGS. 5-6, except for the configuration of the cutting edge 220.

The cutting edge 220 includes an inclined cutting edge portion 260, a declined cutting edge portion 262, and a cutting tip portion 276, similar to the inclined cutting edge portion 160, declined cutting edge portion 162, and cutting tip portion 176 of the saw blade 110. Like the saw blade 110, the cutting edge 220 of the saw blade 210 does not have a parallel cutting edge portion between the inclined and declined cutting edge portions. Each inclined cutting edge portion 260 extends from a first tooth 266 (closer to the rear end 214) to a second tooth 268 (closer to the front end 216) and rises away from the blade axis X as it extends toward the front end 216 at an acute first angle α2 to the blade axis X, such that the first tooth 266 is closer to the blade axis than the second tooth 268 (possibly with variations in tooth height, pitch, and set pattern as described above with respect to FIGS. 1-4F). The declined cutting edge portion 262 extends from the second tooth 268 (closer to the rear end 214) to a first tooth 266' of the next inclined cutting edge portion (closer to the front end 216) and falls toward the blade axis as it extends toward the front end 116 at an acute second angle β2 to the blade axis X, such that the first tooth 266 is closer to the blade axis than the second tooth 268 (possibly with variations in tooth height, pitch, and set pattern as described above with respect to FIGS. 1-4F). In an example, the first tooth 266 may be the lowest distance from the blade axis, while the second tooth 268 may be spaced the highest distance from the blade axis (possibly with variations in tooth height, pitch, and set pattern as described above with respect to FIGS. 1-4F). As shown by the solid lines 284, 286, the tips of the cutting teeth 250 in the inclined cutting edge portion 260 and the tips of the teeth 254 in the declined cutting edge portion 262 are arranged in a straight profile with the tips of the teeth generally disposed along substantially straight lines 284, 286 (possibly with variations in tooth height, pitch, and set pattern as described above with respect to FIGS. 1-4F). The cutting edge 220 may include a plurality of the inclined cutting edge portions 260 and a plurality of the declined cutting edge portions 262, arranged in a repeating sequence of an inclined cutting edge portion 260, followed by a declined cutting edge portion 262. The cutting tip portion 276 is located at the front end 216 and may be generally parallel to the blade axis X (possibly with variations in tooth height, pitch, and set pattern as described above with respect to FIGS. 1-4F).

Like the saw blade 110, the second angle β2 is greater than the first angle α2. However, unlike the saw blade 110, the second angle β2 is not significantly greater than the first angle α2. For example, the first angle may be from approximately 0.50° to approximately 3° and the second angle may be from approximately 1° to approximately 25°. The inclined cutting edge portion 260 has a first length L1 and rises by an amplitude A away from the blade axis X. The declined cutting edge portion 264 has a second length L2 and falls by an amplitude A toward the blade axis X. Like the saw blade 110, the second length L2 of the declined cutting edge portion 262 is shorter than the first length L1 of the inclined cutting edge portion 260. However, unlike the saw blade 110, the second length L2 is not significantly shorter than the first length L1. For example, the first length L1 may be the length of 6 to 12 teeth or from approximately 0.5 inches to approximately 1.5 inches (e.g., approximately 0.9 inches) and the second length L2 may be the length of 1 to 6 teeth or from approximately 0.015 inches to approximately 0.5 inches (e.g., approximately 0.25 inches). The amplitude A of the declined cutting edge portion 262 may be the same or different than the amplitude A of the inclined cutting edge portion 260. In an example, the amplitudes are the same, and may be from approximately 0.01 inches to approximately 0.03 inches (e.g., approximately 0.02 inches). The repeating pattern on the cutting edge 220 my further improve tip cutting or unsupported cutting in which a tip cutting portion 276 of the cutting edge 220 is used to cut the workpiece.

The first tooth 266 of the first inclined cutting edge portion 260 along the length of the cutting edge 220 is positioned a distance L4 from the center of a hole 238 in the tang 230. The distance L4 serves to constrain the location of the repeating declined cutting edge portions 262 and inclined cutting edge portions 260 relative to the blade holder and shoe of the reciprocating saw that is holding the reciprocating saw blade. It has been discovered that life and cutting speed of the reciprocating saw blade can be optimized when the first tooth 66 is positioned approximately at the location of a shoe on the reciprocating saw that is holding the saw blade when the blade is at the furthest extension of its saw stroke. Because shoes on different reciprocating saws are positioned at different distances from the blade holder, the distance L4 of the first tooth 266 from the tang hole 238 is selected to work optimally with most commercially available reciprocating saws. In certain embodiments the distance L4 may be approximately 0.75 inches to approximately 1.50 inches. In other implementations, the first tooth may be located at approximately a midpoint of the working zone. The first tooth may be located at approximately 35% to 55% of a total length of the saw blade from an opening in the tang.

Like the saw blade 110, the inclined cutting edge portion 260 and the cutting tip portion 276 have cutting teeth 250 with their rake faces 252 facing toward the rear end 214 of the saw blade 210. However, unlike the saw blade 110, the declined cutting edge portion 262 has cutting teeth 254 with their rake faces 256 facing toward the front end 216 of the saw blade. The cutting teeth 254 on the declined cutting edge portion 260 facilitates cutting on the reverse stroke of the saw blade 210, which may increase cutting speed and improve blade life.

Figure 9:
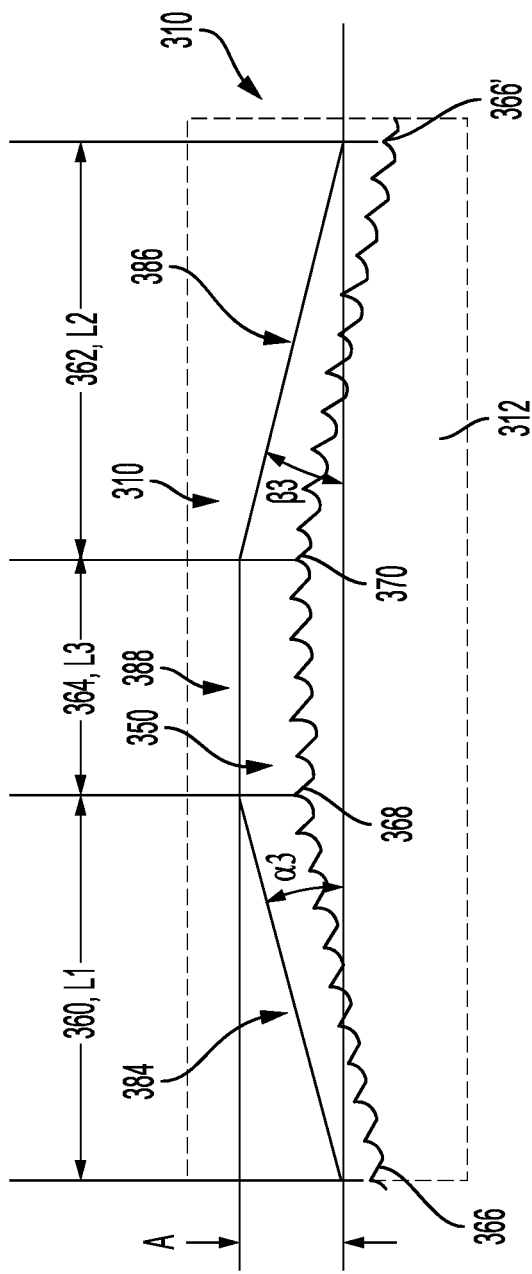
FIG. 9 is a close up view of a portion of a cutting edge of another embodiment of a reciprocating saw blade.

Referring to FIG. 9, in another embodiment, a cutting edge 320 of a reciprocating saw blade 310 includes an inclined cutting edge portion 360, a declined cutting edge portion 362, and a parallel cutting edge portion 364 between the inclined and declined cutting edge portions 360, 362, similar to the inclined cutting edge portion 60, declined cutting edge portion 62, and parallel cutting edge portion 64 of the saw blade 10 of FIGS. 1-3. The inclined cutting edge portion 360 extends from a first tooth 366 to a second tooth 368 (closer to the front end of the saw blade 310) and rises away from the blade axis X as it extends toward the front end at an acute first angle α3 to the blade axis, such that the first tooth 366 is closer to the blade axis than the second tooth 368 (possibly with variations in tooth height, pitch, and set pattern as described above with respect to FIGS. 1-4F). The declined cutting edge portion 362 extends from a third tooth 370 to a first tooth 366' of the next inclined cutting edge section (closer to the front end of the saw blade 310) and falls toward the blade axis as it extends toward the front end 316 at an acute second angle β3 to the blade axis, such that the first tooth 366' is closer to the blade axis than the third tooth 370 (possibly with variations in tooth height, pitch, and set pattern as described above with respect to FIGS. 1-4F). The parallel cutting edge portion 364 extends from the second tooth 368 to the third tooth 370, between the inclined cutting edge portion 360 and the declined cutting edge portion 362, generally parallel to the blade axis (possibly with variations in tooth height, pitch, and set pattern as described above with respect to FIGS. 1-4F). In an example, the first teeth 366, 366' may be the smallest distance from the blade axis, while the second and third teeth 368, 370 may be the spaced the largest distance from the blade axis (possibly with variations in tooth height, pitch, and set pattern as described above with respect to FIGS. 1-4F). As shown by the solid lines 384, 386, 388 the tips of the cutting teeth 50 in the inclined cutting edge portion 360, the declined cutting edge portion 362, and the parallel cutting edge portion 364 are arranged in a straight profile with the tips of the teeth generally disposed along substantially straight lines 384, 386, 388 (possibly with variations in tooth height, pitch, and set pattern as described above with respect to FIGS. 1-4F). The cutting edge 350 may include a plurality of the inclined cutting edge portions 360, a plurality of the declined cutting edge portions 362, and a plurality of the parallel cutting edge portions 364, arranged in a repeating sequence of an inclined cutting edge portion 360, followed by a parallel cutting edge portion 364, followed by a declined cutting edge portion 362.

The first tooth 266 of the first inclined cutting edge portion 260 along the length of the cutting edge 20 may be positioned a distance L4 (not shown) from the center of a hole in the tang 30. The distance L4 serves to constrain the location of the repeating declined cutting edge portions 262, inclined cutting edge portions 260, and parallel cutting edge portions 264 relative to the blade holder and shoe of the reciprocating saw that is holding the reciprocating saw blade. It has been discovered that life and cutting speed of the reciprocating saw blade can be optimized when the first tooth 66 is positioned approximately at the location of a shoe on the reciprocating saw that is holding the saw blade when the blade is at the furthest extension of its saw stroke. Because shoes on different reciprocating saws are positioned at different distances from the blade holder, the distance L4 of the first tooth 266 from the tang hole is selected to work optimally with most commercially available reciprocating saws. In certain embodiments the distance L4 may be approximately 0.75 inches to approximately 1.50 inches. In other implementations, the first tooth may be located at approximately a midpoint of the working zone. The first tooth may be located at approximately 35% to 55% of a total length of the saw blade from an opening in the tang.

Unlike the saw blade 10, the first angle α3 and the second angle β3 may be substantially equal. For example, the first angle α3 may be from approximately 0.50° to approximately 3° and the second angle β3 may be from approximately 0.50° to approximately 3°. The inclined cutting edge portion 360 has a first length L1 and rises by an amplitude A away from the blade axis X. The declined cutting edge portion 364 has a second length L2 and falls by an amplitude A toward the blade axis X. The parallel cutting edge portion 364 has a third length L3. Unlike the saw blade 10, the first length L1 of the inclined cutting edge 360 and the second length L2 of the declined cutting edge portion 362 may be substantially the same, while the length L3 of the parallel cutting edge portion 364 may be less than the first and second lengths L1, L2 of the inclined and declined cutting edge portions 360, 362. For example, the first length L1 and the second length L2 each may be the length of 6 to 12 teeth or from approximately 0.5 inches to approximately 1.5 inches (e.g., approximately 0.9 inches), and the third length L3 may be the length of 3 to 7 teeth, from approximately 0.25 inches to approximately 0.75 inches (e.g., approximately 0.35 inches). The amplitudes of the inclined cutting edge portion 360 and the declined cutting edge portion 362 may be the same or different. In an example, the amplitudes are the same, and may be from approximately 0.01 inches to approximately 0.03 inches (e.g., approximately 0.02 inches).

Figure 10:
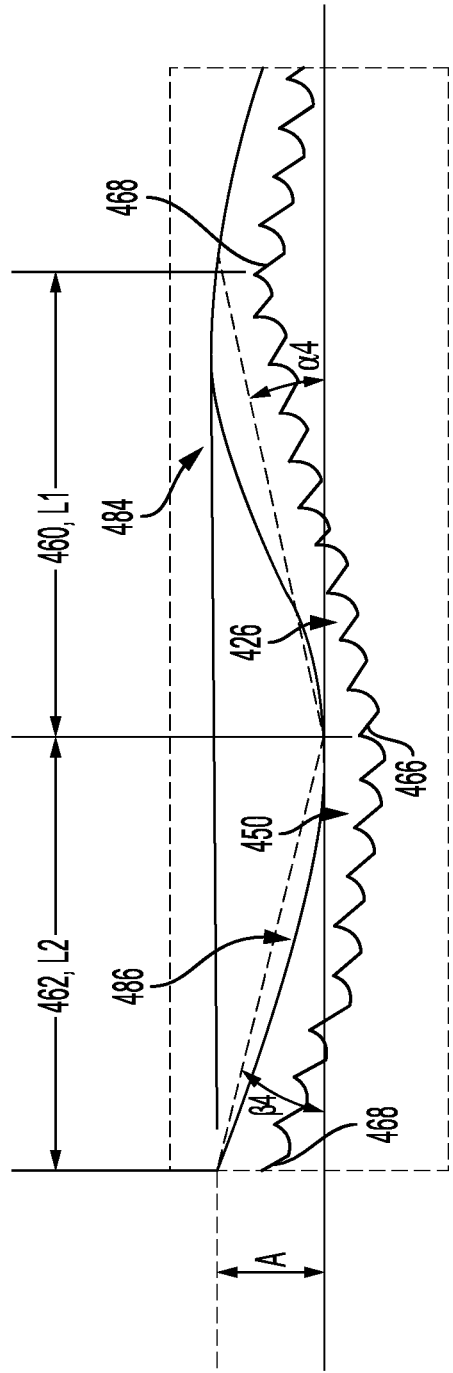
FIG. 10 is a close up view of a portion of a cutting edge of another embodiment of a reciprocating saw blade.

Referring to FIG. 10, in another embodiment, a cutting edge 420 of a reciprocating saw blade 410 includes an inclined cutting edge portion 460 and a declined cutting edge portion 462. The inclined cutting edge portion 460 extends from a first tooth 466 (closer to the rear end of the saw blade 410) to a second tooth 468 (closer to the front end of the saw blade 410) and rises away from the blade axis as it extends toward the front end at an acute first angle α4 to the blade axis, such that the first tooth 466 is closer to the blade axis than the second tooth 468 (possibly with variations in tooth height, pitch, and set pattern as described above with respect to FIGS. 1-4F). The declined cutting edge portion 462 extends from the second tooth 468 to a first tooth 466 of the next inclined cutting edge section (closer to the front end of the saw blade 410) and falls toward the blade axis as it extends toward the front end 416 at an acute second angle β3 to the blade axis X, such that the next first tooth 470 is closer to the blade axis than the second tooth 468 (possibly with variations in tooth height, pitch, and set pattern as described above with respect to FIGS. 1-4F). In an example, the first teeth 466, 470 may be the smallest distance from the blade axis, while the second tooth 468 may be spaced the largest distance from the blade axis (possibly with variations in tooth height, pitch, and set pattern as described above with respect to FIGS. 1-4F). The cutting edge 450 may include a plurality of the inclined cutting edge portions 460 and a plurality of the declined cutting edge portions 462, arranged in a repeating sequence of an inclined cutting edge portion 460, followed by a declined cutting edge portion 462.

Unlike the saw blades 110, 210, the first angle α4 and the second angle β4 may be substantially equal. For example, the first angle α4 may be from approximately 0.50° to approximately 3° and the second angle β4 may be from approximately 0.50° to approximately 3°. The inclined cutting edge portion 460 has a first length L1 and rises by an amplitude A away from the blade axis. The declined cutting edge portion 464 has a second length L2 and falls by an amplitude A toward the blade axis. The length L1 of the inclined cutting edge 460 and the second length L2 of the declined cutting edge portion 462 may be substantially the same. For example, the first length L1 and the second length L2 each may be the length of 6 to 12 teeth or from approximately 0.5 inches to approximately 1.5 inches (e.g., approximately 0.9 inches). The amplitudes of the inclined cutting edge portion 360 and the declined cutting edge portion 362 may be the same or different. In an example, the amplitudes are the same, and may be from approximately 0.01 inches to approximately 0.03 inches (e.g., approximately 0.02 inches).

The first tooth 466 of the first inclined cutting edge portion 460 along the length of the cutting edge 420 is positioned a distance L4 (not shown) from the center of a hole in the tang. The distance L4 serves to constrain the location of the repeating declined cutting edge portions 262 and inclined cutting edge portions 260. It has been discovered that life and cutting speed of the reciprocating saw blade can be optimized when the first tooth 66 is positioned approximately at the location of a shoe on the reciprocating saw that is holding the saw blade when the blade is at the furthest extension of its saw stroke. Because shoes on different reciprocating saws are positioned at different distances from the blade holder, the distance L4 of the first tooth 266 from the tang hole is selected to work optimally with most commercially available reciprocating saws. In certain embodiments the distance L4 may be approximately 0.75 inches to approximately 1.50 inches. In other implementations, the first tooth may be located at approximately a midpoint of the working zone. The first tooth may be located at approximately 35% to 55% of a total length of the saw blade from an opening in the tang.

As shown by the solid line 484 the tips of the cutting teeth 50 in the inclined cutting edge portion 460 are arranged in a curved concave-convex profile with the tips of the teeth generally disposed along curved line 484. As shown by the solid line 486 the tips of the cutting teeth 50 in the declined cutting edge portion 462 are arranged in a curved convex-concave profile with the tips of the teeth generally disposed along curved line 486. Together, the tips of the cutting teeth 50 in the inclined and declined cutting edge portions 460, 462 are arranged in a curved, undulating profile, e.g., a sinusoidal profile.

Figure 11:
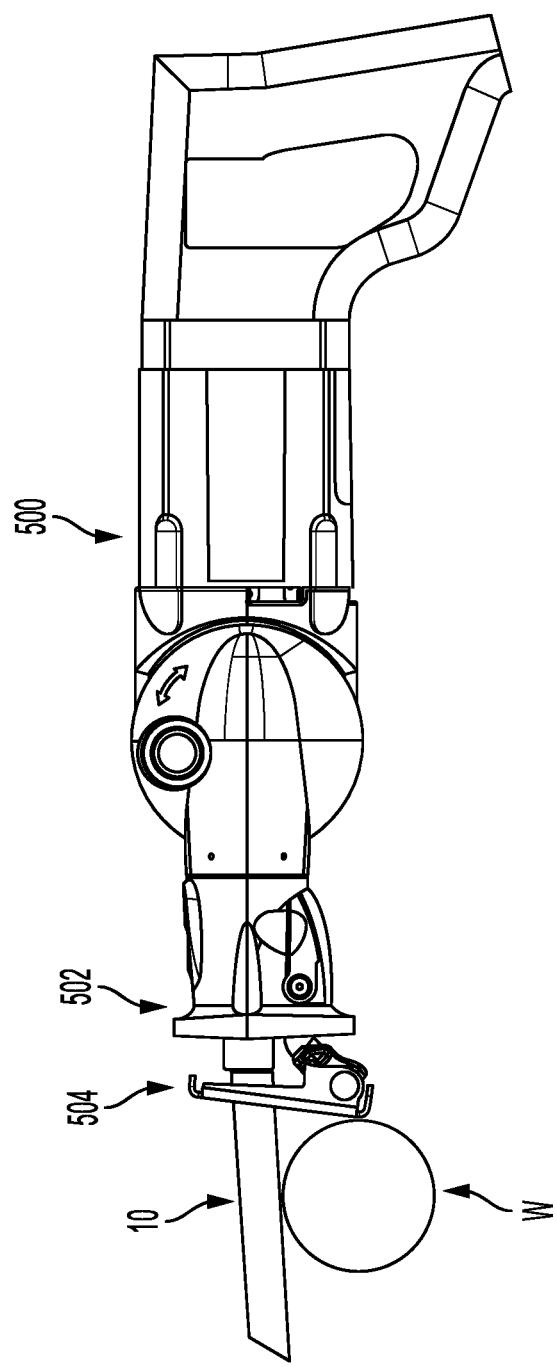
FIG. 11 is a side view an embodiment of a reciprocating saw blade coupled to a powered reciprocating saw and being used to cut a workpiece.
Figure 12:
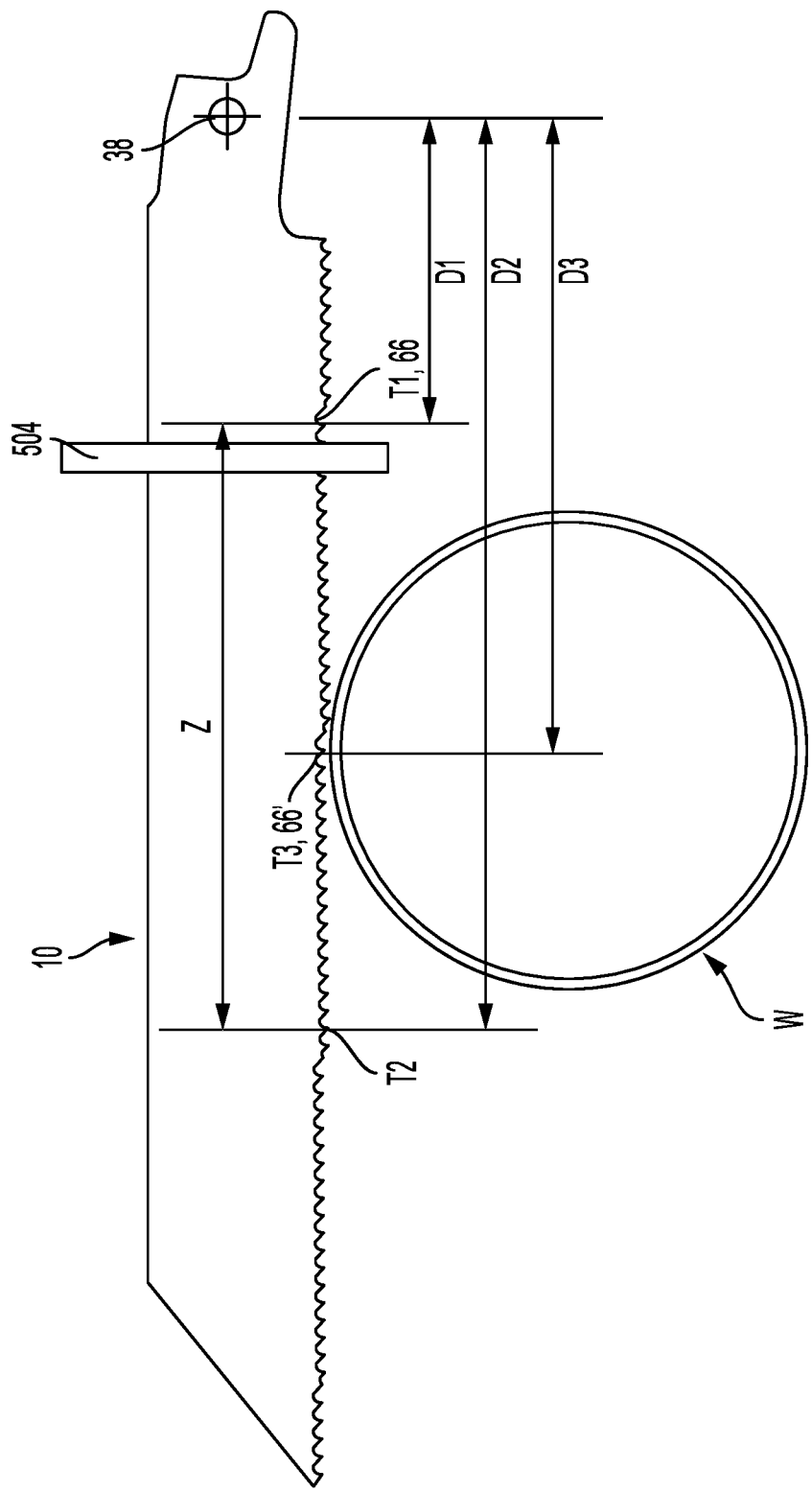
FIG. 12 is a side view of the reciprocating saw blade, the shoe of the powered reciprocating saw, and the workpiece shown in FIG. 11.

Referring also to FIGS. 11-12, as discussed above, in each of the above-described reciprocating saw blades, the life and cutting speed of the reciprocating saw blades may be improved by optimizing the location of the lowest teeth along the length of the cutting edge (i.e., the location of the first tooth in the first inclined cutting edge portion). For example, FIG. 11 illustrates the saw blade 10 described above coupled to a powered reciprocating saw 500 and cutting a workpiece W. However, it should be understood that the following discussion may apply to any of the saw blades described in this application. As shown in FIG. 11, the reciprocating saw 500 includes a blade holder 502 (also known as a blade clamp or blade chuck) that receives and retains the saw blade tang, and a shoe 504 that sits in front of the blade holder 502, which the blade body 20 extending through the shoe 504 and engaging the workpiece W. In normal operation, the user will rest the shoe 504 against one edge of the workpiece.

As shown in FIG. 12, the cutting edge 20 of the saw blade 10 has a working zone Z that extends from the front of the shoe 504 that abuts the workpiece W to the opposite edge of the workpiece W, plus or minus the amount of distance that the saw blade reciprocates relative to the workpiece. The location of the working zone can be defined as the zone between a first tooth T1 closest to the blade shoe 504 when the saw blade 10 is fully extended from the blade shoe 504 during reciprocation to a second tooth T2 closest to the opposite edge of the workpiece W when the saw blade 10 is fully retracted into the workpiece. It has been discovered that the life and cutting speed of the saw blade may be optimal when the first tooth 66 of the first inclined cutting edge portion is positioned at tooth T1 (i.e., at the start of the working zone Z) such that the first tooth 66 (which is closest to the blade axis) is located approximately at the shoe 504 of the reciprocating saw to which the saw blade is coupled when the blade is at the furthest extension of its saw stroke.

The first distance D1 of the first tooth T1, 66 may be generally constant regardless of blade size and workpiece size, since the shoe 504 is usually kept at a fixed distance relative to the blade holder 502 (e.g., approximately 1.8 inches from the tang hole 38). The second distance D2 of the second tooth T2 varies depending on the length of the saw blade and the size of the workpiece. It has been determined, that for most reciprocating saw blade sizes and intended workpieces, the first distance D1 should be approximately 0.75 inches to approximately 1.50 inches (e.g., approximately 1.18 inches).

In other embodiments, it has also been discovered that when cutting a round workpiece such as a pipe, it is desirable for the center tooth T3 of the working zone to also be a first tooth 66 of another inclined cutting edge portion, so that the cut will start with the tooth that is closest to the blade axis. The center tooth T3 is located a third distance D3 from the hole 38 in the tang and will vary depending on the size of the workpiece to be cut. Because certain sizes and types of reciprocating saw blades generally are designed for cutting certain types and sizes of materials, the second and third distances D2, D3 may be selected for most applications for which a particular saw blade is designed. It has been determined, that for most reciprocating saw blade sizes and intended workpieces, it is optimal for the third distance D3 of the lowest tooth 66 be approximately 35% to 55% (e.g., approximately 40% to 50%) of the total blade length LT.

For example, in the below Table 1, reciprocating saw blades intended for cutting standard sizes of black metal pipe, the first, second, and third distances D1, D2, D3 may be determined, where it is assumed that the shoe is located 1.80 inches from the tang center hole 38 and the saw blade reciprocates by 1.25 inches.

Experimental testing reveals that the inclined and declined cutting edge portions of the above-described reciprocating saw blades facilitate cutting at more aggressive angles relative to the tang than could otherwise be achieved by only increasing the tang angle. This markedly improves life and also unexpectedly improves cutting speed, while also reducing poor cut quality and vibration associated with a larger tang angle. The bump teeth also receive impact loads, which reduce the overall loading on the cutting teeth, further improving life, while at the same time unexpectedly improving cutting speed. In addition, the reciprocating saw blades in this application achieve better tip cutting or unsupported cutting than existing reciprocating saw blades, and reduce damage to the teeth from rubbing against the shoe of a powered reciprocating saw.

For example, as shown below in Table 2, several samples of reciprocating saw blades designed in accordance with this patent application were tested for life (number of cuts until blade failure) in cutting three different metal materials. In one test, samples of the saw blades were tested to determine the number of cuts that could be made in 1" Sch 40 Black Pipe until the blades were unable to make a cut in less than 45 seconds, at which point they are considered at the end of life. In another test, samples of the saw blades were similarly tested to determine the number of cuts that could be made in 1½" electrical metallic tubing (EMT) until the blades were unable the to make the cut in less than 20 seconds. In yet another test, samples of the saw blades were similarly tested to determine the number of cuts that could be made in 1½"×⅛" angle iron until the blades were unable to make the cut in less than 60 seconds. In each test, the samples were compared to a control group of samples of commercially available LENOX® Metal Cutting Reciprocating Saw Blades with T2™ Technology, similar to the saw blades disclosed in the aforementioned U.S. Pat. No. 8,210,081, which do not have the inclined or declined cutting edge portions described above.

TABLE 1

| Pipe Size | Outside Diameter (in.) | Tooth Pitch (tpi) | Blade Length (in.) | First Distance D1 (in.) | Second Distance D2 (in.) | Third Distance D3 (in.) | D3 as % of Blade Length |
|---|---|---|---|---|---|---|---|
| ⅛ | 0.405 | 18 | 4.0 | 1.18 | 2.21 | 1.70 | 42% |
| ¼ | 0.540 | 18 | 4.0 | 1.18 | 2.34 | 1.76 | 44% |
| ⅜ | 0.675 | 18 | 4.0 | 1.18 | 2.48 | 1.83 | 46% |
| ½ | 0.840 | 14 | 4.0 | 1.18 | 2.64 | 1.91 | 48% |
| ¾ | 1.050 | 14 | 6.0 | 1.18 | 2.85 | 2.01 | 34% |
| 1 | 1.315 | 14 | 6.0 | 1.18 | 3.12 | 2.15 | 36% |
| 1¼ | 1.660 | 10/14 | 6.0 | 1.18 | 3.46 | 2.32 | 39% |
| 1½ | 1.900 | 10/14 | 6.0 | 1.18 | 3.70 | 2.44 | 41% |
| 2 | 2.375 | 10 | 6.0 | 1.18 | 4.18 | 2.68 | 45% |
| 2½ | 2.875 | 10 | 6.0 | 1.18 | 4.68 | 2.93 | 49% |
| 3 | 3.500 | 8 | 8.0 | 1.18 | 5.30 | 3.24 | 40% |
| 3½ | 4.000 | 8 | 8.0 | 1.18 | 5.80 | 3.49 | 44% |
| 4 | 4.500 | 8 | 8.0 | 1.18 | 6.30 | 3.74 | 47% |
| 5 | 5.563 | 8 | 8.0 | 1.18 | 7.36 | 4.27 | 53% |

TABLE 2

Life Test

|  | Control | Sample 1 | Sample 2 | Sample 3 | Sample 4 | Sample 5 | Sample 6 | Sample 7 |
|---|---|---|---|---|---|---|---|---|
| Tooth Pitch (tpi) | 14 | 14 | 14 | 14 | 14 | 14 | 14 | 10/14 |
| Total Length (L) (inches) | N/A | 2.00 | 2.00 | 2.00 | 0.87 | 1.33 | 1.50 | 1.20 |
| Incline Length (L1) (inches) | N/A | 1.50 | 1.00 | 0.80 | 0.42 | 0.90 | 0.70 | 0.64 |
| Parallel Length (L2) (inches) | N/A | 0.25 | 0.50 | 0.90 | 0.35 | 0.35 | 0.70 | 0.49 |
| Decline Length (L3) (inches) | N/A | 0.25 | 0.50 | 0.30 | 0.06 | 0.06 | 0.06 | 0.06 |
| Amplitude (A) (inches) | N/A | 0.02 | 0.02 | 0.02 | 0.02 | 0.02 | 0.02 | 0.02 |
| Black pipe # cuts | 82.2 | 100.2 | 108.5 | 149.8 | 181.7 | 155.0 | 133.7 | 175.0 |
| % vs. control |  | 122% | 132% | 182% | 221% | 189% | 163% | 213% |
| EMT # cuts | 165.3 | 139.2 | 109.7 | 154.7 | 137.0 | 233.0 | 204.5 | 174.7 |
| % vs. control |  | 84% | 66% | 94% | 83% | 141% | 124% | 106% |
| Angle Iron # cuts | 225.5 | 360.5 | 317.3 | 381.7 | 114.7 | 255.2 | 126.8 | 280.8 |
| % vs. control |  | 160% | 141% | 169% | 51% | 113% | 56% | 125% |
| 3 material % average vs. control |  | 122% | 113% | 148% | 118% | 148% | 114% | 148% |

As shown above, the saw blades of the present invention demonstrated dramatically unexpected improvements in life ranging from 113% to 148% across these three materials.

As shown below in Tables 3 and 4, several other samples of reciprocating saw blades designed in accordance with this patent application were tested for life (number of cuts until blade failure) and cutting speed (seconds per cut) in cutting two different metal materials. In one test, samples of the saw blades were tested in 1" SCH40 Black Pipe to determine the speed per cut by averaging the speed per cut of the first five cuts, and the number of cuts that could be made in less than 45 seconds, at which point they are considered at the end of life. In another test, samples of the saw blades were similarly tested in 1½" electrical metallic tubing (EMT) to determine the speed per cut by averaging the speed per cut of the first five cuts, and life was determined by the number of cuts that could be made in less than 20 seconds per cut.

TABLE 3

Life Test

|  | Control | Sample 8 | Sample 9 |
|---|---|---|---|
| Pitch (tpi) | 14 | 14 | 14 |
| Total Length (L) (inches) | N/A | 1.33 | 1.00 |
| Incline Length (L1) (inches) | N/A | 0.90 | 0.64 |
| Parallel Length (L2) (inches) | N/A | 0.35 | 0.35 |
| Decline Length (L3) (inches) | N/A | 0.06 | 0.06 |
| Amplitude (A) (inches) | N/A | 0.02 | 0.02 |
| Black pipe # cuts | 80.5 | 197.3 | 94.6 |
| % vs. control |  | 245% | 118% |
| EMT # cuts | 236.5 | 377.8 | 366.8 |
| % vs. control |  | 160% | 155% |
| 2 material % average vs. control |  | 202% | 136% |

TABLE 4

Cutting Speed Test

|  | Control | Sample 8 | Sample 9 |
|---|---|---|---|
| Pitch (tpi) | 14 | 14 | 14 |
| Total Length (L) (inches) | N/A | 1.33 | 1.00 |
| Incline Length (L1) (inches) | N/A | 0.90 | 0.64 |
| Parallel Length (L2) (inches) | N/A | 0.35 | 0.35 |
| Decline Length (L3) (inches) | N/A | 0.06 | 0.06 |
| Amplitude (A) (inches) | N/A | 0.02 | 0.02 |
| Black pipe speed of cut (sec) | 11.0 | 9.6 | 9.8 |
| % vs. control |  | 115% | 112% |
| EMT speed of cut (sec) |  | 8.6 | 8.3 |
| % vs. control |  | 110% | 114% |
| 2 material % average vs. control |  | 113% | 113% |

As shown above, the saw blades of the present invention demonstrated dramatic improvements ranging from 136% to 202% in life, while also unexpectedly improving cutting speed by an average of 113% across each of these materials.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this patent application.

What is claimed is:

1. A reciprocating saw blade comprising:
an elongated blade body extending along a blade axis and having a rear end, a front end, a cutting edge having a plurality of teeth and extending between the rear end and the front end, and a non-cutting edge opposite the cutting edge and extending between the rear end and the front end; and
a tang coupled to the rear end and configured to be received in a blade holder of a powered reciprocating saw,
wherein the cutting edge includes (a) an inclined cutting edge portion extending away from the blade axis and toward the front end at an acute first angle to the blade axis, the inclined cutting edge portion extending from a first tooth to a second tooth, the first tooth closer to the rear end and closer to the blade axis than the second tooth; and (b) a declined cutting edge portion extending toward the blade axis and toward the front end at an acute second angle that is greater than the first angle, the declined cutting edge extending from a third tooth to the first tooth, the first tooth closer to the front end and closer to the blade axis than the third tooth; and (c) a parallel cutting edge portion starting at the second tooth and extending toward the front end from the second tooth substantially parallel to the blade axis.

2. The reciprocating saw blade of claim 1, wherein the cutting edge comprises a plurality of the inclined cutting edge portions, a plurality of the declined cutting edge portions, and a plurality of the parallel cutting edge portion, the cutting edge has a repeating sequence of a declined cutting edge portion, followed by an inclined cutting edge portion, followed by a parallel cutting edge portion.

3. The reciprocating saw blade of claim 1, wherein the inclined cutting edge portion has a first length and the declined cutting edge portion has a second length that is less than the first length.

4. The reciprocating saw blade of claim 3, wherein the parallel cutting edge portion has a third length that is less than the first length and greater than the second length.

5. The reciprocating saw blade of claim 3, wherein the first length of the inclined cutting edge portion is at least two times longer than the second length of the declined cutting edge portion.

6. The reciprocating saw blade of claim 1, wherein the tang includes a hole and the first tooth is located approximately 0.75 inches to approximately 1.50 inches from a center of the hole.

7. The reciprocating saw blade of claim 1, wherein the first tooth is disposed a first distance from the blade axis, the second tooth is disposed a second distance from the blade axis that is greater than the first distance, and a difference between the second distance and the first distance defines an amplitude by which the inclined cutting edge portion rises relative to the blade axis and the declined cutting edge portion falls relative to the blade axis.

8. The reciprocating saw blade of claim 1, wherein the declined cutting edge portion includes at least one intermediate tooth between the third tooth and the first tooth.

9. The reciprocating saw blade of claim 8, wherein the at least one intermediate tooth comprises at least one bump tooth having a tooth height less than a tooth height of the third tooth.

10. The reciprocating saw blade of claim 8, wherein the at least one intermediate tooth has a size that is substantially similar to a size of the third tooth.

11. A reciprocating saw blade comprising:
an elongated blade body extending along a blade axis and having a rear end, a front end, a cutting edge having a plurality of teeth and extending between the rear end and the front end, and a non-cutting edge opposite the cutting edge and extending between the rear end and the front end; and
a tang coupled to the rear end and configured to be received in a blade holder of a powered reciprocating saw,
wherein the cutting edge includes (a) an inclined cutting edge portion extending away from the blade axis and toward the front end at an acute first angle to the blade axis, the inclined cutting edge portion extending from a first tooth to a second tooth, the first tooth closer to the rear end and closer to the blade axis than the second tooth; and (b) a declined cutting edge portion extending toward the blade axis and toward the front end at an acute second angle that is greater than the first angle, the declined cutting edge extending from a third tooth to the first tooth, the first tooth closer to the front end and closer to the blade axis than the third tooth, wherein the inclined cutting edge portion has a first length that is greater than a second length of the declined cutting edge portion, and wherein the declined cutting edge portion includes at least one intermediate tooth between the third tooth and the first tooth.

12. The reciprocating saw blade of claim 11, wherein the at least one intermediate tooth comprises at least one bump tooth having a tooth height less than a tooth height of the third tooth.

13. The reciprocating saw blade of claim 12, wherein the at least one intermediate tooth has a configuration different from the third tooth.

14. The reciprocating saw blade of claim 11, wherein the at least one intermediate tooth has a size that is substantially similar to a size of the third tooth.

15. The reciprocating saw blade of claim 11, wherein the tang includes a hole and the first tooth is located approximately 0.75 inches to approximately 1.50 inches from a center of the hole.

16. The reciprocating saw blade of claim 11, wherein the first length of the inclined cutting edge portion is at least two times longer than the second length of the declined cutting edge portion.

17. A reciprocating saw blade comprising:
an elongated blade body extending along a blade axis and having a rear end, a front end, a cutting edge having a plurality of teeth and extending between the rear end and the front end, and a non-cutting edge opposite the cutting edge and extending between the rear end and the front end; and a tang defining a hole, coupled to the rear end, and configured to be received in a blade holder of a powered reciprocating saw, wherein the cutting edge includes (a) an inclined cutting edge portion extending away from the blade axis and toward the front end at an acute first angle to the blade axis, the inclined cutting edge portion extending from a first tooth to a second tooth, the first tooth closer to the rear end and closer to the blade axis than the second tooth; and (b) a declined cutting edge portion extending toward the blade axis and toward the front end at an acute second angle that is greater than the first angle, the declined cutting edge extending from a third tooth to the first tooth, the first tooth closer to the front end and closer to the blade axis than the third tooth, wherein the inclined cutting edge portion has a first length that is greater than a second length of the declined cutting edge portion, and wherein the first tooth is located approximately 0.75 inches to approximately 1.50 inches from a center of the hole.

18. The reciprocating saw blade of claim 17, wherein the declined cutting edge portion includes at least one intermediate tooth between the third tooth and the first tooth.

19. The reciprocating saw blade of claim 18, wherein the at least one intermediate tooth comprises at least one bump tooth having a tooth height less than a tooth height of the third tooth.

20. The reciprocating saw blade of claim 17, wherein the first length of the inclined cutting edge portion is at least two times longer than the second length of the declined cutting edge portion.

* * * * *